US007072861B1

(12) United States Patent
Yamanaka et al.

(10) Patent No.: US 7,072,861 B1
(45) Date of Patent: Jul. 4, 2006

(54) DIGITAL CONTENT DOWNLOADING SYSTEM USING NETWORKS

(75) Inventors: Hideaki Yamanaka, Tokyo (JP); Teruhiko Moriyama, Tokyo (JP); Katsuaki Kikuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 903 days.

(21) Appl. No.: 09/692,197

(22) Filed: Oct. 20, 2000

(30) Foreign Application Priority Data

Dec. 15, 1999 (JP) .................................. 11-355330

(51) Int. Cl.
*G06F 17/30* (2006.01)

(52) U.S. Cl. ........................................ 705/27; 709/218

(58) Field of Classification Search ................ 395/226; 705/26, 27; 709/219, 225, 201; 707/10; 370/230, 466, 352
See application file for complete search history.

(56) References Cited

U.S. PATENT DOCUMENTS 5,710,887 A * 1/1998 Chelliah et al. ............... 705/26
5,745,694 A * 4/1998 Egawa et al. ................ 709/225

(Continued)

FOREIGN PATENT DOCUMENTS

EP      0 849 920      6/1998

(Continued)

OTHER PUBLICATIONS

"Integrated services over unified switching: Understanding Sprint ION"; Marty Kaplan; Computer Technology Review; Los Angles; May 1999, vol. 19, Iss, 5; p. 18, 3pgs.*

(Continued)

*Primary Examiner*—Robert M. Pond
*Assistant Examiner*—R. E. Rhode
(74) *Attorney, Agent, or Firm*—Oblon, Spivak, McClelland, Maier & Neustadt, P.C.

(57) ABSTRACT

In cases where a consumer desires to receive digital content from a digital content retailer through a network, information designating the digital content and a digital content transmission condition such as a transfer rate and a transmission time-zone are sent to the digital content retailer through the network. The digital content retailer reserves the transfer rate and the transmission time-zone in the network and downloads the digital content to the consumer through the network at the digital content transmission condition according to the reservation. After the downloading of the digital content is completed, the consumer pays a charge for the digital content itself and a transmission charge corresponding to the digital content transmission condition to a credit company, the credit company pays the charges to the digital content retailer, and the digital content retailer pays the transmission charge to a network operator managing the network. Therefore, the consumer can specify a time condition like the transmission time-zone for the downloading of the digital content. Also, because it is not required that the consumer directly pays the transmission charge to the network operator, the payment of the consumer can be efficiently performed.

14 Claims, 24 Drawing Sheets

U.S. PATENT DOCUMENTS

| | | | |
|---|---|---|---|
| 5,898,668 A * | 4/1999 | Shaffer | 370/230 |
| 5,905,736 A | 5/1999 | Ronen et al. | |
| 5,918,213 A * | 6/1999 | Bernard et al. | 705/26 |
| 6,157,924 A * | 12/2000 | Austin | 707/10 |
| 6,317,438 B1 * | 11/2001 | Trebes, Jr. | 370/466 |
| 6,330,586 B1 * | 12/2001 | Yates et al. | 709/201 |
| 6,529,950 B1 * | 3/2003 | Lumelsky et al. | 709/218 |
| 6,587,837 B1 * | 7/2003 | Spagna et al. | 705/26 |
| 6,594,692 B1 * | 7/2003 | Reisman | 709/219 |
| 6,636,505 B1 * | 10/2003 | Wang et al. | 370/352 |

FOREIGN PATENT DOCUMENTS

| | | | |
|---|---|---|---|
| EP | 0 921 487 | | 6/1999 |
| JP | 7-22996 | | 1/1995 |
| JP | 8-79269 | | 3/1996 |
| JP | 8-190472 | | 7/1996 |
| JP | 8-191308 | | 7/1996 |
| JP | 8-204779 | | 8/1996 |
| JP | 9-84087 | | 3/1997 |
| JP | 10-51445 | | 2/1998 |
| JP | 10-198610 | | 7/1998 |
| JP | 10-243018 | | 9/1998 |
| JP | 10-269291 | | 10/1998 |
| JP | 10-308776 | | 11/1998 |
| JP | 11-17775 | | 1/1999 |
| JP | 11-32020 | | 2/1999 |
| JP | 11088396 | * | 3/1999 |
| JP | 11-155030 | | 6/1999 |
| JP | 11-272711 | | 10/1999 |
| JP | 11-328050 | | 11/1999 |
| JP | 2000-332750 | | 11/2000 |
| WO | WO 98/58474 | | 12/1998 |

OTHER PUBLICATIONS

Value-Added Internet: a Pragmatic TINA-Based Path to the Internet and PTSN Integration; G. De Zen, Proceedings of the Global Convergence of Telecommunications and Distributed Object Computing: TINA 97 Conference, Nov. 17-20, 1997, Santiago, Chile.*

"Integrated services unified switching: Understanding Sprint ION" Marty Kaplan, Computer Technology Review, Los Angeles, May 1999.*

Value-Added Internet; a Pragmatic TINA-Based Path to the Internet and PTSN Integration; G. De Zen, Proceedings of the Global Convergence of Telecommunications and Distributed Object Computing: TINA 97 Conference, Nov. 17-20, 1997, Santiago, Chile.*

Canadian Office Action, dated Apr. 28, 2005 in Application No. 2,323,370.

De Zen et al., "Value-Added Internet: a Pragmatic TINA-Based Path to the Internet and PSTN Integration", Proceedings of the Global Convergence of Telecommunications and Distribution Object Computing, TINA '97 Conference, Nov. 17-20, 1997, Santiago, Chile, 8 pgs.

"Integrated Services Digital Network (ISDN) Service Capabilities", IITU-T Recommendation I.211 (Mar. 1993), B-ISND Service Aspects, pp. a1-a2, i-ii and 1-13 (Recommendation I.211 (Aug. 1992)).

"Series X: Data Networks and Open System Communication" Public data networks—Maintenance, ITU-T REcommendation x. 161 (Aug. 1997), pp. a1-a2, i-iv and 1-23.

"Series I: Integrated Services Digital Network" Overall network aspect and functions-General network requirements and functions, ITU-T Recommendation I.375.2 (Jun. 1998), pp. a1-a2, i-iii, and 1-23.

* cited by examiner

FIG.9

TRANSMISSION CONDITION SPECIFICATION
SCIENCE FICTION
COUNTERATTACK OF COSMIC MONSTER
FOR 1 HOUR 30 MINUTES AT 2.7 GBy tes   PURCHASE BUTTON BANDWIDTH GUARANTEE TYPE, 100 Mb/s, ABOUT 4 MINUTES, ¥450   [Buy]
BANDWIDTH GUARANTEE TYPE, 50 Mb/s, ABOUT 8 MINUTES, ¥420   [Buy]
BANDWIDTH NO-GUARANTEE TYPE, CBR CLASS, ABOUT 40 MINUTES, ¥350   [Buy]
BAND NO-GUARANTEE TYPE, ABR CLASS, ABOUT 60 MINUTES, ¥320   [Buy]
BANDWIDTH NO-GUARANTEE TYPE, UBR CLASS, MORE THAN ABOUT 120 MINUTES, ¥300   [Buy]

ATTENTION [Go]   NOTES: WRITTEN TRANSMISSION TIME IS NOT GUARANTEED IN CASE OF
RETURN TO TOP [Go]   THE SELECTION OF BANDWIDTH NO-GUARANTEE TYPE

FIG.10

AUTHENTICATION

PLEASE CLICK A CORRESPONDING PLACE

LOG-IN

MEMBER'S NUMBER [          ]

PAYMENT METHOD

CREDIT CARD [          ] [Go]
    DEPOSIT POINT OF THIS CENTER IS USED [Go]
    PAY LATER [Go]

MEMBER REGISTRATION [Go]

JUST LOOK CHARGE [Go]

FIG.11
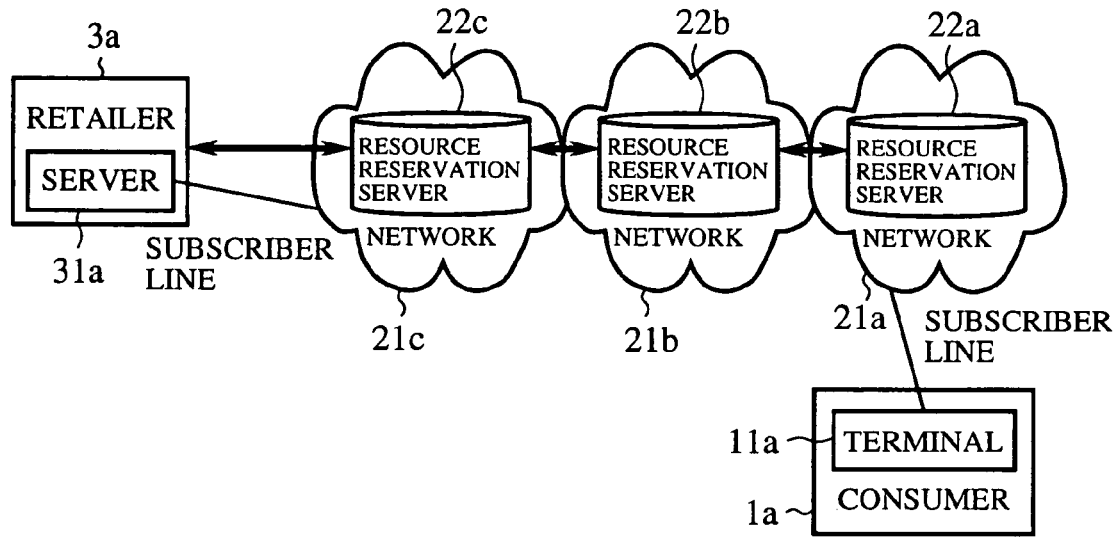
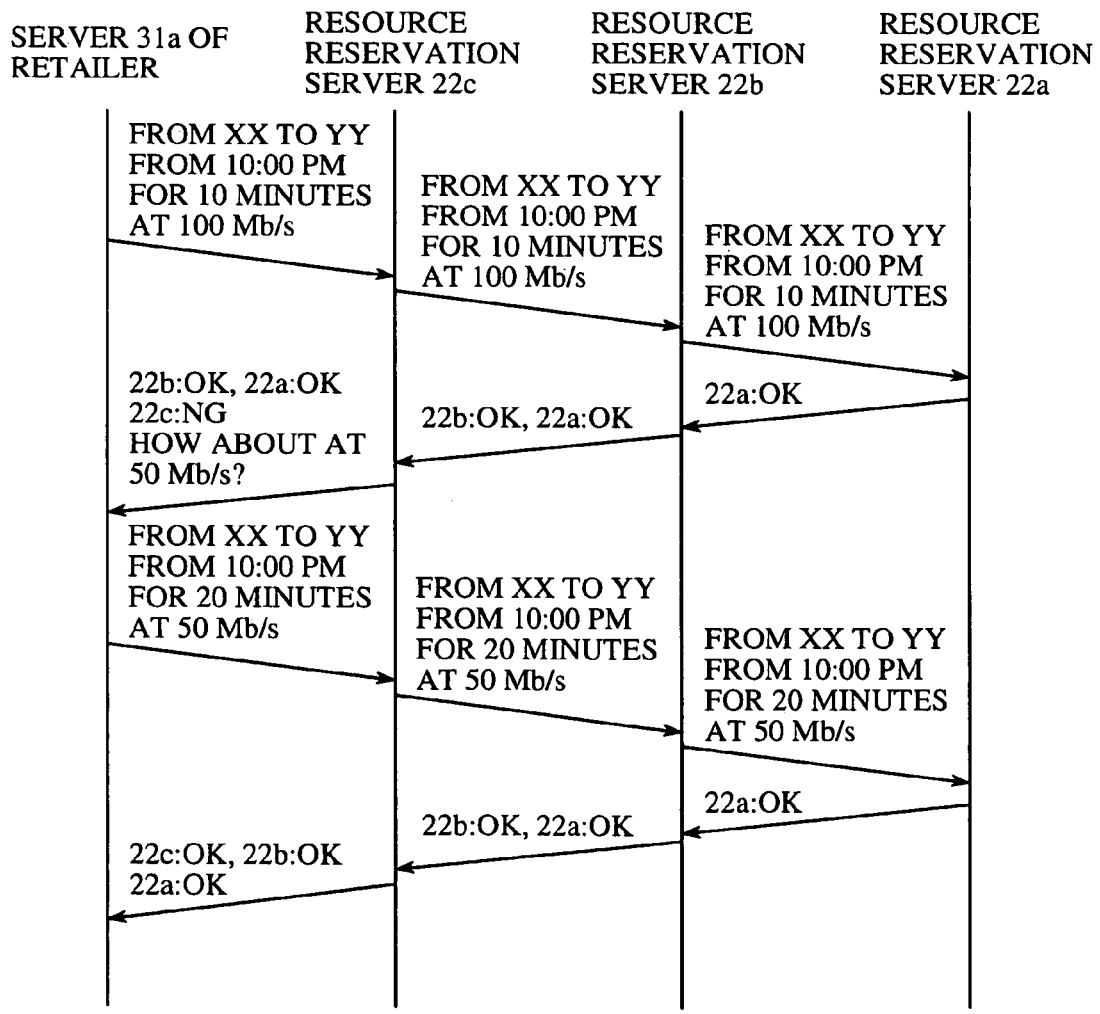

TO FIG. 26

DIGITAL CONTENT DOWNLOADING SYSTEM USING NETWORKS

BACKGROUND OF THE INVENTION

1. Field of the Invention

The present invention relates to a digital content downloading system in which digital content such as music files, video files, game software titles and so on are downloaded to a plurality of consumers through networks.

2. Description of Related Art

In a current business field using a communication network, the interest of people has been changed from "technology-oriented" to "service-oriented". In particular, people have paid attention to the Asynchronous Transfer Mode (ATM) as a technique guaranteeing the Quality of Service (QOS) indicating the communication quality. In an ATM network with the appropriate network managing performance, various types of traffic such as the internet protocol (IP), frame relay and voice can be simultaneously processed, and the service quality for the digital content can be easily guaranteed. Therefore, the ATM network is expected as a strong tool for digital content delivery.

Also, if network managing functions of ATM networks are available, a business using networks can be easy by utilizing various QOS classes such as Variable Bit Rate (VBR), non-real time service classes and so on, which means the business becomes "service-quality oriented" instead of "technology-oriented". For example, to provide a technology service for consumers, a highly-efficient QOS class can be used in stead 6*f* a simple class of Constant Bit Rate (CBR). The technology of the network management is not only used for the management of hardware such as routers, switches and so on, but also used as a means of "service management".

This strict service management is feasible because the ATM network has a high-performance QOS managing capability. In the ATM networks, parameters such as a transfer bit rate (which is also called "bandwidth" in this technical field), a delay time, a delay variation, a burst size, a cell interval and a cell discard rate, thus the virtual circuit (VC) can be precisely established with QOS guarantee.

In ATM Forum, QOS characteristics of each virtual circuit are classified, and four service classes are defined. They are CBR class, real time VBR class, non-real time VBR class and available bit rate/unspecified bit rate (ABR/UBR) class.

As is described above, because the four service classes are provisioned in ATM networks, even though congestion occurs in one of the four service classes, the influence of the congestion to the other classes can be prevented. For example, even though the congestion of data traffic occurs in an ATM switch, voice or video traffic belonging to the CBR class can be stably transmitted.

Also, charging of downloading of digital content to each consumer using ATM networks has been studied. To maintain a competitive edge in public network services, a fixed charge for the digital content download is not proper, but a policy of determining a charge depending on a type of the digital content or a downloading quality of the digital content is desired. For example, in many proposals of charging mechanisms, it is applicable that a charge for a CBR service be higher than that for a best effort type UBR service. Also, it is proposed that a charge for digital content be selected by a time zone, or that a charge for the digital content be decided in proportion to a bandwidth used for downloading or a service time zone.

In these proposals, a consumer who downloads digital content is charged in dependence on not only types of the digital content such as music files, video files of a cinema or map and game software titles but also the quality or time of downloading digital content. Therefore, the charging mechanism depending on how to use networks is possible.

However, in the digital content downloading system using the conventional optical access network, though the consumer can specify digital content itself, the consumer cannot specify a quality in the transmission of the digital content transmitting through a subscriber line, but the digital content retailer can specify the transmission quality of the digital content.

Also, in cases where the consumer purchases digital content, the consumer accesses to a digital content retailer possessing the digital content to obtain a data volume of the digital content from the digital content retailer, the consumer reports the data volume of the digital content to a network operator to secure a channel of a subscriber line, the consumer again accesses to the digital content retailer to inform the digital content retailer of the channel of the subscriber line, and the digital content retailer downloads the digital content to the consumer through the channel of the subscriber line. Therefore, there is a problem that the procedure for purchasing the digital content is complicated and troublesome.

Also, in cases where the consumer purchases digital content downloaded at a high quality transmission, in which the digital content is downloaded only for a short time, from a digital content retailer through a network of a network operator, not only the consumer has to pay a charge for the digital content to the digital content retailer, but also the consumer has to pay a charge for the high quality transmission to the network operator. Therefore, there is another problem that the procedure for paying the charges is complicated and troublesome.

SUMMARY OF THE INVENTION

An object of the present invention is to provide, with due consideration to the drawbacks of the conventional digital content downloading system using a network, a digital content downloading system using a network in which a consumer desiring the downloading of digital content through a network easily receives the digital content at a desired transmission condition of the digital content.

The object of the present invention is achieved by the provision of a digital content downloading system using a network in which digital content is downloaded, comprising the steps of:

making a consumer send both information designating a desired digital content selected by the consumer and a desired digital content transmission condition selected by the consumer to a digital content retailer possessing the desired digital content through a network;

making the digital content retailer reserve the network managed by a network operator according to the desired digital content transmission condition sent from the consumer;

making the digital content retailer download the desired digital content designated by the information to the consumer through the network reserved by the digital content retailer at the desired digital content transmission condition sent from the consumer;

making the digital content retailer collect a charge for the desired digital content, in which a transmission charge corresponding to the desired digital content transmission condition is included, from the consumer; and making the digital content retailer pay the transmission charge to the network operator.

In the above steps, after the network is reserved by the digital content retailer to secure a bandwidth in the network, a transmission time zone in the network or the like, the desired digital content specified by the consumer is downloaded to the consumer through the reserved network at the desired digital content transmission condition specified by the consumer. Thereafter, the digital content retailer collects the charge for the desired digital content itself and the transmission charge corresponding to the desired digital content transmission condition from the consumer, and the digital content retailer pay the transmission charge to the network operator.

Accordingly, because the downloading of the desired digital content is reliably performed at the desired digital content transmission condition specified by the consumer, a downloading service corresponding to any digital content transmission condition can be performed.

Also, because the consumer directly pays no charge to the network operator but pays the charge for the desired digital content itself and the charge for the transmission of the desired digital content to the digital content retailer, the payment of the consumer can be efficiently performed.

It is preferred that the desired digital content transmission condition selected by the consumer is a transmission time condition such as an urgent transmission condition, a date and time specifying transmission condition or a date specifying transmission condition.

The consumer can select one of the transmission time conditions according to the necessity for the desired digital content. Therefore, a distinction between services in the transmission of the digital content can be made in this system, and the downloading of the desired digital content through the network without considering any time condition can be avoided when the network has been already burdened with the transmission of high volume data.

It is also preferred that the network is composed of a plurality of networks managed by a plurality of network operators, and the desired digital content transmission condition selected by the consumer corresponds to a communication quality of each of the networks.

The transmission charge can be set according to a service corresponding to the communication quality of each network, so that a charge service corresponding to the communication quality can be performed.

It is also preferred that the communication quality of each network is determined by one of a data transfer rate, a delay time, a delay variation, a burst size, a cell interval and a cell discard rate.

The transmission charge can be set according to a service corresponding to a data transfer rate, a delay time, a delay variation, a burst size, a cell interval and/or a cell discard rate, so that a charge service corresponding to the communication quality can be performed.

It is also preferred that a bandwidth of the network is reserved with a time condition in the network reservation performed according to the desired digital content transmission condition.

The consumer can receive a service satisfying a communication quality required by the consumer.

It is also preferred that the desired digital content transmission condition selected by the consumer is a bandwidth guarantee type transmission condition, in which a transmission time period is guaranteed, or a bandwidth no-guarantee type transmission conditions, in which a transmission time period is not guaranteed, and the transmission charge is heightened as the transmission time period is shortened.

The transmission charge can be set according to a service corresponding to the guarantee on the bandwidth and the transmission time period, so that a charge service corresponding to the communication quality can be performed.

It is also preferred that the step of making the digital content retailer download the desired digital content includes:

making the digital content retailer check through the network whether or not the consumer has a capability such as a memory capacity for receiving the desired digital content, before the desired digital content is downloaded to the consumer at the desired digital content transmission condition.

To reduce a probability that the consumer fails in receiving the desired digital content because of the capability shortage of the consumer, the bandwidth of the network can be effectively used.

It is also preferred that the step of making the digital content retailer download the desired digital content includes:

connecting the consumer to the network through a subscriber line which is composed of a telephone line, an optical fiber cable, a coaxial cable or a radio transmission line.

The desired digital content is transmitted through the subscriber line, so that a charge service can be performed at a high quality.

It is also preferred that the step of making the digital content retailer download the desired digital content includes:

making the digital content retailer send a transmission start notice to the consumer before the downloading of the desired digital content;

making the network operator manage a transmission time period in the transmission of the desired digital content until the digital content retailer sends a transmission completion notice to the network operator;

making the network operator send a time-out notice to the digital content retailer in cases where the transmission time period exceeds a prescribed value; and making the digital content retailer forcedly terminate the downloading of the desired digital content in cases where the digital content retailer receives the time-out notice from the network operator.

In cases where a trouble occurs in the transmission of the desired digital content, the transmission of the desired digital content is forcedly terminated. Therefore, the bandwidth of the network can be effectively used.

It is also preferred that the step of making the digital content retailer download the desired digital content includes:

making the digital content retailer cipher the desired digital content;

making the digital content retailer download ciphered data of the desired digital content; and making the consumer decipher the ciphered data of the desired digital content to obtain the desired digital content.

Because ciphered data of the desired digital content transmits through the network, a probability that a person different from the consumer unjustly and illegally obtain the desired digital content can be reduced.

It is also preferred that the step of making the consumer send both the information and the desired digital content transmission condition includes:

making the consumer send personal information of the consumer and payment information to the digital content retailer;

making the digital content retailer inquire of a credit company whether or not the personal information and the payment information sent from the consumer is correct;

making the credit company perform the authentication of the consumer according to the personal information and the payment information; and making the credit company send an authentication notice to the digital content retailer in cases where the personal information and the payment information is correct.

After an authentication of the consumer is performed in the credit company, the downloading of the desired digital content is performed. Therefore, the charge for the desired digital content can be reliably collected from the consumer.

It is also preferred that the step of making the digital content retailer collect a charge for the desired digital content includes:

making the digital content retailer send an accounting notice corresponding to the charge for the desired digital content to a credit company;

making the credit company send a bill, which corresponds to the charge for the desired digital content, to the consumer in response to the accounting notice;

making the consumer pay the charge for the desired digital content to the credit company in response to the bill; and making the credit company pay the charge paid by the consumer to the digital content retailer.

Because the consumer pay the charge for the desired digital content to the credit company in response to the bill, the payment of the consumer can be simplified.

It is also preferred that the step of making the digital content retailer download the desired digital content includes:

making the consumer send a reception impossible notice to the digital content retailer in cases where the consumer fails in receiving the desired digital content;

making the digital content retailer send a transmission termination notice to the network operator; and making the digital content retailer send a transmission no-completion notice to the consumer.

Because the consumer sends the reception impossible notice to the digital content retailer, the digital content retailer can confirm that the consumer fails in receiving the desired digital content, so that it is not required that the consumer proves the failure of the reception of the desired digital content.

It is also preferred that the desired digital content is a music file, a video file or a game software title.

The object of the present invention is also achieved by the provision of a digital content downloading system using a network in which digital content is downloaded, comprising the steps of:

making a digital content retailer receive both information designating a desired digital content and a desired digital content transmission condition from a consumer;

making the digital content retailer reserve a network managed by a network operator according to the desired digital content transmission condition sent from the consumer;

making the digital content retailer download the desired digital content designated by the information to the consumer through the network according to the network reservation informed by the network operator;

making the digital content retailer collect a charge for the desired digital content, in which a transmission charge corresponding to the desired digital content transmission condition is included, from the consumer after the downloading of the desired digital content to the consumer is completed; and making the digital content retailer pay the transmission charge to the network operator.

In the above steps, a downloading service corresponding to any digital content transmission condition can be performed. Also, because it is not required that the consumer directly pays a charge to the network operator, the payment of the consumer can be efficiently performed.

It is preferred that the information designating the desired digital content and the desired digital content transmission condition are sent from the consumer to the digital content retailer through the network or a telephone line.

The object of the present invention is also achieved by the provision of a digital content downloading system using a network in which digital content is downloaded, comprising the steps of:

making a network operator managing a network accept a reservation of the network according to a digital content transmission condition sent from a digital content retailer;

making the network operator inform the digital content retailer of the network reservation;

making the network operator download a particular digital content transmitted from the digital content retailer to a consumer through the reserved network according to the network reservation; and making the network operator receive a transmission charge corresponding to the digital content transmission condition from the digital content retailer.

In the above steps, a downloading service corresponding to any digital content transmission condition can be performed.

It is preferred that the transmission charge is a charge corresponding to a communication quality of a downloading service of the particular digital content, and the consumer directly pays a network access charge different from the transmission charge to the network operator.

It is preferred that the step of making the network operator download the particular digital content includes:

making the network operator manage a digital content transmission time period from a transmission start notice sent from the digital content retailer to a transmission completion notice sent from the digital content retailer; and making the network operator send a time-out notice to the digital content retailer, in cases where the digital content transmission time period exceeds a prescribed value, to make the digital content retailer forcedly terminate the downloading of the particular digital content.

In cases where a trouble occurs in the transmission of the particular digital content, the transmission of the particular digital content is forcedly terminated. Therefore, the bandwidth of the network can be effectively used.

The object of the present invention is also achieved by the provision of a digital content downloading system using a network in which digital content is downloaded, comprising the steps of:

making a digital content retailer receive information designating a desired digital content, a desired digital content transmission condition and personal information and payment information of a consumer from the consumer;

making the digital content retailer reserve a network managed by a network operator according to the desired digital content transmission condition sent from the consumer;

making the digital content retailer download the desired digital content designated by the information to the consumer through the network according to the network reservation informed by the network operator;

making the digital content retailer collect a charge for the desired digital content, in which a transmission charge corresponding to the desired digital content transmission condition is included, from a bank according to an authentication of the consumer which is performed by the bank according to the personal information and the payment information of the consumer; and making the digital content retailer pay the transmission charge to the network operator.

In the above steps, the bank pays the charge for the desired digital content itself and the transmission charge corresponding to the desired digital content transmission condition to the digital content retailer in one lump, and the digital content retailer pays the transmission charge to the network operator. Therefore, it is not required that the consumer directly pays the transmission charge to the network operator, so that the payment of the consumer can be efficiently performed.

It is also preferred that the information designating the desired digital content, the desired digital content transmission condition and the personal information and the payment information of the consumer are sent from the consumer to the digital content retailer through the network or a telephone line.

The information other than the digital content can be transmitted through the telephone line.

It is also preferred that the digital content downloading system using a network further comprises the step of:

making the consumer deposit money in his or her account of the bank before the information designating the desired digital content, the desired digital content transmission condition and the personal information and the payment information of the consumer are sent from the consumer to the digital content retailer, wherein the step of making the digital content retailer collect a charge includes:

making the bank pay out the charge for the desired digital content including the transmission charge corresponding to the desired digital content transmission condition from the account of the consumer.

Because the consumer deposits money in his or her account of the bank in advance, the payment of the consumer can be omitted when the desired digital content is downloaded.

It is also preferred that the step of making the digital content retailer collect a charge is performed before the step of making the digital content retailer download the desired digital content designated by the information to the consumer.

Because the digital content retailer collects the charge for the desired digital content including the transmission charge before the downloading of the desired digital content, the digital content retailer can reliably collect the charge.

It is also preferred that the step of making the digital content retailer download the desired digital content includes:

making the digital content retailer receive a reception impossible notice sent from the consumer in cases where the consumer fails in receiving the desired digital content;

making the digital content retailer send a transmission termination notice to the network operator in response to the reception impossible notice to make the network operator terminate the transmission of the desired digital content; and making the digital content retailer repay the charge for the desired digital content including the transmission charge corresponding to the desired digital content transmission condition to the bank in response to the reception impossible notice.

In cases where the digital content retailer collects the charge for the desired digital content including the transmission charge before the downloading of the desired digital content, even though the consumer fails in receiving the desired digital content, because the digital content retailer repays the charge for the desired digital content including the transmission charge, no trouble of the payment occurs.

It is also preferred that the step of making the digital content retailer download the desired digital content includes:

making the digital content retailer receive a reception impossible notice sent from the consumer in cases where the consumer fails in receiving the desired digital content;

making the digital content retailer send a transmission termination notice to the network operator in response to the reception impossible notice to make the network operator terminate the transmission of the desired digital content;

making the digital content retailer receive second information designating a second desired digital content and a second desired digital content transmission condition from the consumer;

making the digital content retailer reserve the network managed by the network operator according to the second desired digital content transmission condition sent from the consumer; and making the digital content retailer download the second desired digital content designated by the second information to the consumer through the network according to the network reservation informed by the network operator.

In cases where the digital content retailer collects the charge for the desired digital content including the transmission charge before the downloading of the desired digital content, even though the consumer fails in receiving the desired digital content, because the second desired digital content is downloaded to the consumer in place of the desired digital content, no trouble of the payment occurs.

BRIEF DESCRIPTION OF THE DRAWINGS

FIG. 9 is a diagram showing an example of an image of a transmission condition menu used to specify a transmission condition for the digital content "counterattack of cosmic monster";

FIG. 10 is a diagram showing an example of an authentication image sent as an authentication request to a consumer;

FIG. 11 is a diagram showing a procedure for a bandwidth reservation;

DETAILED DESCRIPTION OF THE PREFERRED EMBODIMENTS

The invention will now be described with reference to the accompanying drawings.

Embodiment 1

Figure 1:
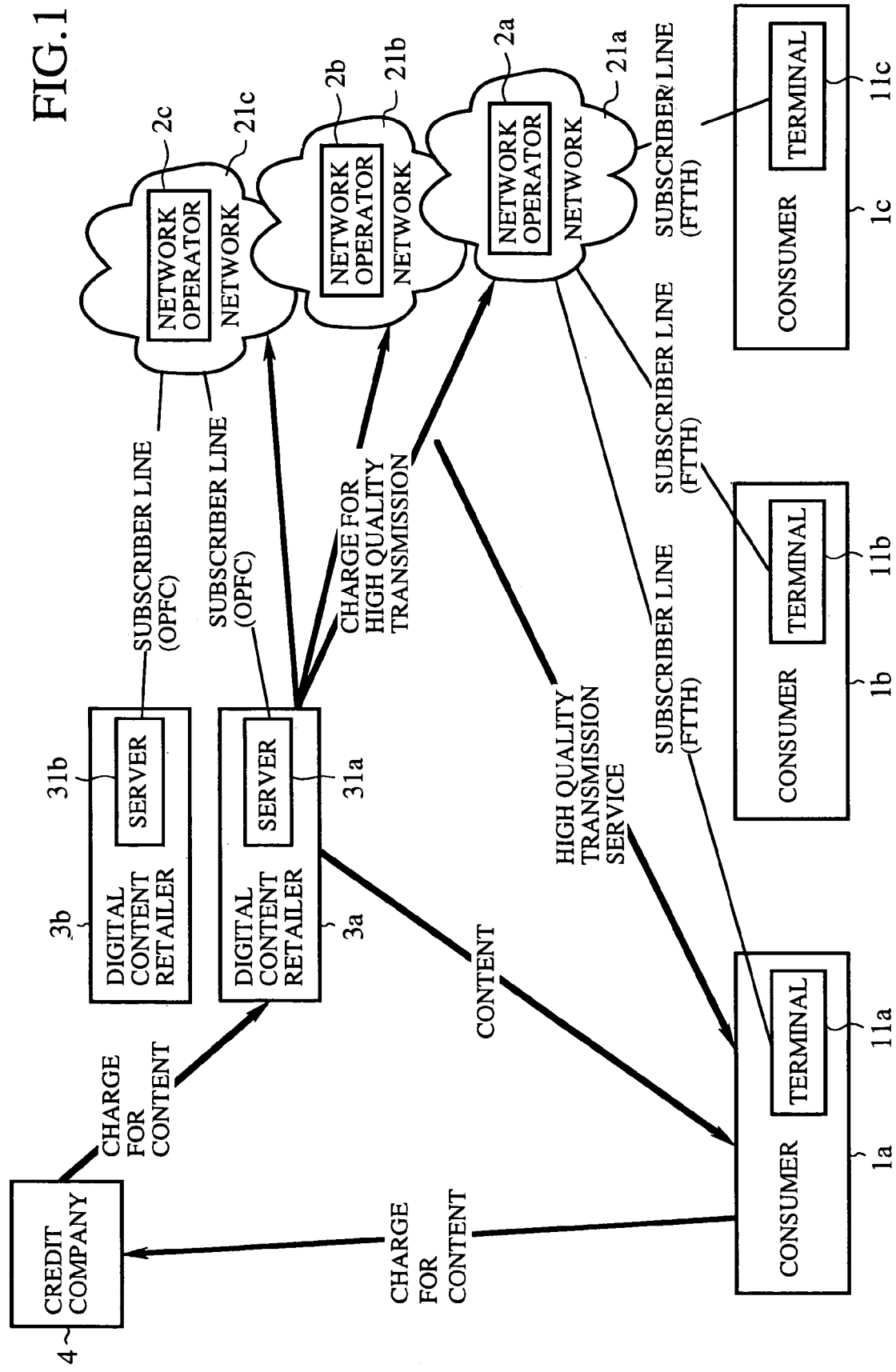
FIG. 1 is a diagram showing the configuration of a digital content downloading system using a network according to a first embodiment of the present invention.

FIG. 1 is a diagram showing the configuration of a digital content downloading system using a network according to a first embodiment of the present invention.

In FIG. 1, each of reference numerals 1$a$, 1$b$ and 1$c$ indicates a consumer who purchases digital content, and reference numerals 11$a$, 11$b$ and 11$c$ indicate a plurality of terminals respectively possessed by one of the consumers 1$a$, 1$b$ and 1$c$. Each terminal denotes a personal computer with a normal internet function or the like. Reference numerals 3$a$ and 3$b$ indicate a plurality of digital content retailers for providing digital content such as music files, video files, game software titles and so on for the consumers 1$a$, 1$b$ and 1$c$, and reference numerals 31$a$ and 31$b$ indicate a plurality of servers possessed by the digital content retailers 3$a$ and 3$b$. Reference numerals 21$a$, 21$b$ and 21$c$ indicate a plurality of backbone networks arranged in series between the group of consumer 1$a$, 1$b$ and 1$c$ and the group of digital content retailers 3$a$ and 3$b$, reference numerals 2$a$, 2$b$ and 2$c$ indicate a plurality of network operators respectively managing one of the backbone networks 21$a$, 21$b$ and 21$c$, and a reference numeral 4 indicates a credit company for performing the authentication of the consumers 1$a$, 1$b$ and 1$c$ and performing the accounting relating to the provision of the digital content downloaded to each consumer.

Figure 2:
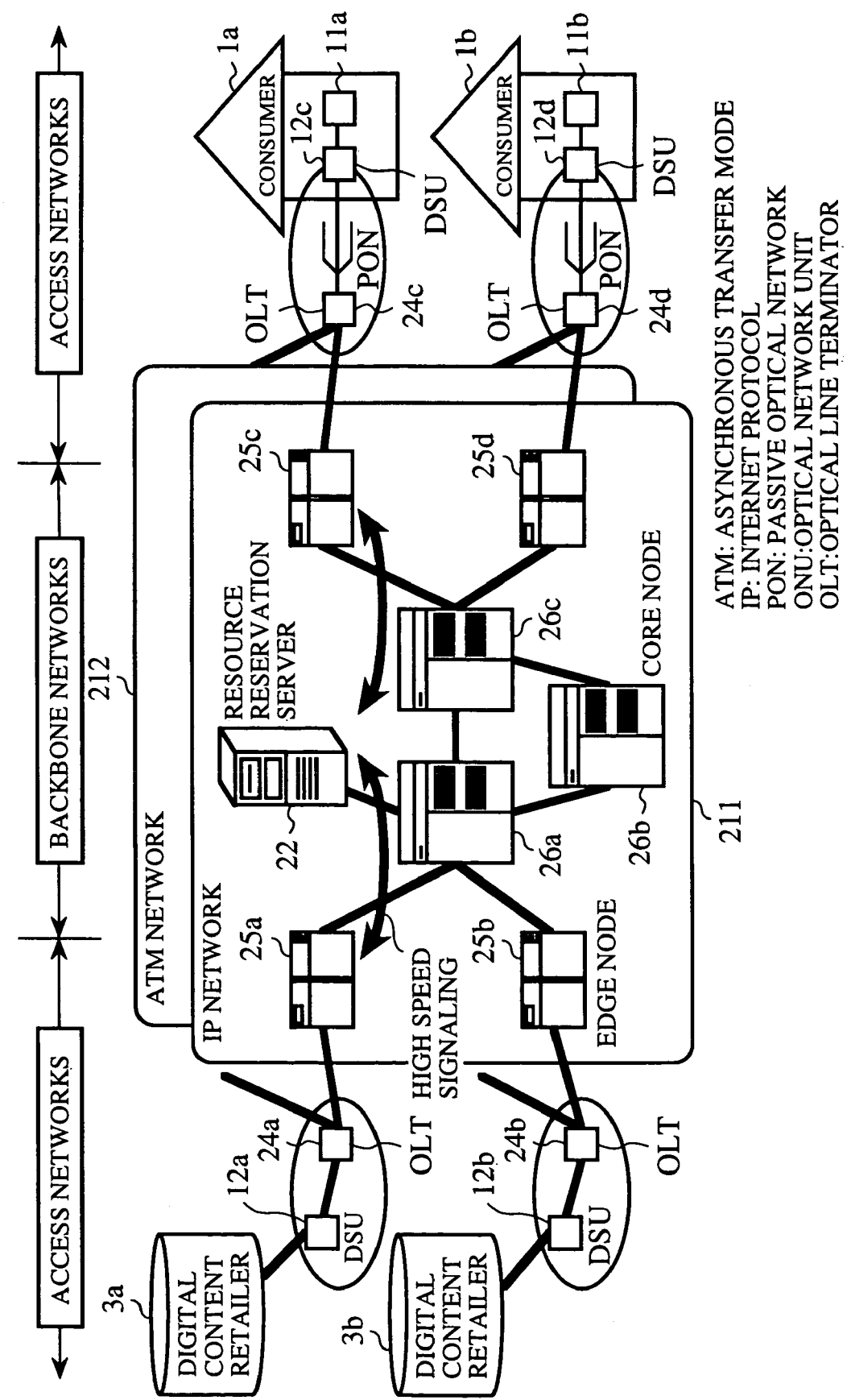
FIG. 2 is a diagram showing the configuration of backbone networks, access networks connecting consumers to the backbone networks and access networks connecting digital content retailers to the backbone networks according to the first embodiment of the present invention.

FIG. 2 is a diagram showing the configuration of the backbone networks 21$a$, 21$b$ and 21$c$, access networks connecting the consumers to the backbone networks and access networks connecting the digital content retailers to the backbone networks according to the first embodiment of the present invention.

In FIG. 2, the reference numerals 1$a$ and 1$b$ indicate the consumers who purchase digital content, the reference numerals 11$a$ and 11$b$ indicate the terminals respectively possessed by one of the consumers 1$a$ and 1$b$, the reference numerals 3$a$ and 3$b$ indicate the digital content retailers who supply the digital content to the consumers 1$a$ and 1$b$, a reference numeral 211 indicates an internet protocol (IP) network using an internet protocol (IP), and a reference numeral 212 indicates an asynchronous transfer mode (ATM) network using an asynchronous transfer mode (ATM). The backbone networks 21$a$, 21$b$ and 21$c$ have the IP network 211 and the ATM network 212. Also, reference numerals 12$a$, 12$b$, 12$c$ and 12$d$ indicate a plurality of digital service units (DSU) denoting terminators of subscriber lines, reference numerals 24$a$, 24$b$, 24$c$ and 24$d$ indicate a plurality of optical line terminators (OLT), which are arranged in offices of the network operators 2$a$ and 2$c$ and are connected to the IP network 211 and the ATM network 212 of the backbone networks 21$a$, 21$b$ and 21$c$ (or the IP network 211 and the ATM network 212), for terminating optical subscriber lines, a reference numeral 22 indicates a resource reservation server, arranged in each of the backbone networks 21$a$, 21$b$ and 21$c$, for managing bandwidths (or transfer rates) of pieces of data transmitting through the subscriber lines and the backbone networks 21$a$, 21$b$ and 21$c$, reference numerals 25$a$, 25$b$, 25$c$ and 25$d$ indicate a plurality of edge nodes through which information transmitted from access networks is sent to the IP network 211 and the ATM network 212 of the backbone networks 21$a$, 21$b$ and 21$c$, and reference numerals 26$a$, 26$b$ and 26$c$ indicate a plurality of core nodes in which information transmitted to the IP network 211 and the ATM network 212 of the backbone networks 21$a$, 21$b$ and 21$c$ are distributed at a high speed.

The access networks connecting the optical network units (ONU) of the consumers 1a and 1b to the optical line terminators (OLT) 24c and 24d are formed of optical access networks of the PON systems in which the asynchronous transfer mode (ATM) is used. That is, a plurality of consumers are connected to one optical line terminator (OLT) in each optical access network of the PON system. Also, digital content retailers 3a and 3b are connected to optical line terminators (OLT) through the access networks in one-to-one correspondence.

Because the access networks of the consumers 1a and 1b are formed of the passive optical network (PON) system, the access networks function as high speed optical networks made at a low cost. In this PON system, a broadcast type information is transmitted from the optical line terminators (OLT) 24c and 24d of the backbone network side to the consumers 1a and 1b through the optical fiber lines as a downward transmission. In contrast, pieces of information indicating requests of the consumers 1a and 1b are transmitted from the consumers 1a and 1b to the optical line terminators (OLT) 24c and 24d through the optical fiber lines as an up-directional transmission while a time slot is allocated to each of the pieces of information to prevent the collision of the pieces of information with each other.

Figure 3:
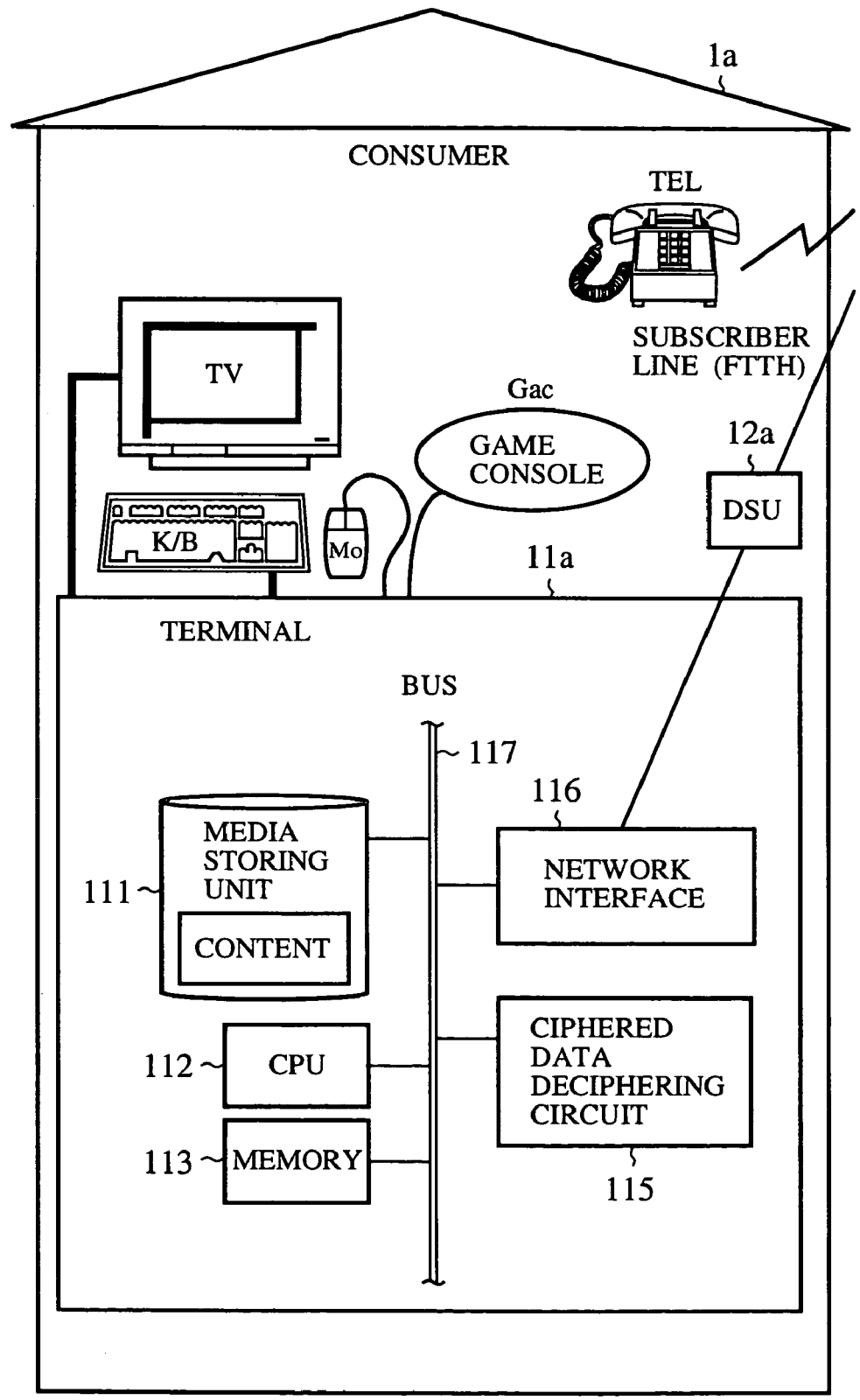
FIG. 3 is a block diagram of a terminal possessed by a consumer according to the first embodiment of the present invention.

FIG. 3 is a block diagram of the terminal 11a possessed by the consumer 1a. The terminal 11a represents the terminals 11a, 11b and 11c possessed by the consumers 1a, 1b and 1c.

The reference numeral 12c indicates the digital service unit (DSU) connecting the subscriber line to the terminal 11a. A reference numeral 111 indicates a media storing unit, having a large data capacity, for storing digital content such as music files, video files, game software titles and so on so as to be optically or magnetically writable and readable. A reference numeral 112 indicates a central processing unit (CPU) for controlling the operation of the terminal 11a, a reference numeral 113 indicates a memory for storing data required to operate the CPU 112, a reference numeral 115 indicates a ciphered data deciphering circuit for deciphering ciphered digital content, a reference numeral 116 indicates a network interface through which information received in the digital service unit (DSU) 12c is received in the terminal 11a and information of the terminal 11a is transmitted to the digital service unit (DSU) 12c, and a reference numeral 117 indicates a bus of the terminal 11a.

The terminal 11a with a game control function of a game console Gac is connected to a keyboard K/B, a mouse Mo and a home television TV functioning as a display to display the digital content. Also, the digital service unit (DSU) 12c is connected to a fiber-to-the-home (FTTH) type two-way subscriber line which is formed of an optical fiber. In this embodiment, the two-way subscriber line FTTH is only arranged to connect the digital service unit (DSU) 12c to the backbone networks 21a, 21b and 21c. However, it is applicable that the subscriber line be formed of a coaxial cable. Also, it is applicable that a telephone line normally used be additionally arranged to make the consumer 1a communicate with the network operators 2a, 2b and 2c of the backbone networks 21a, 21b and 21c or the digital content retailers 3a and 3b.

Figure 4:
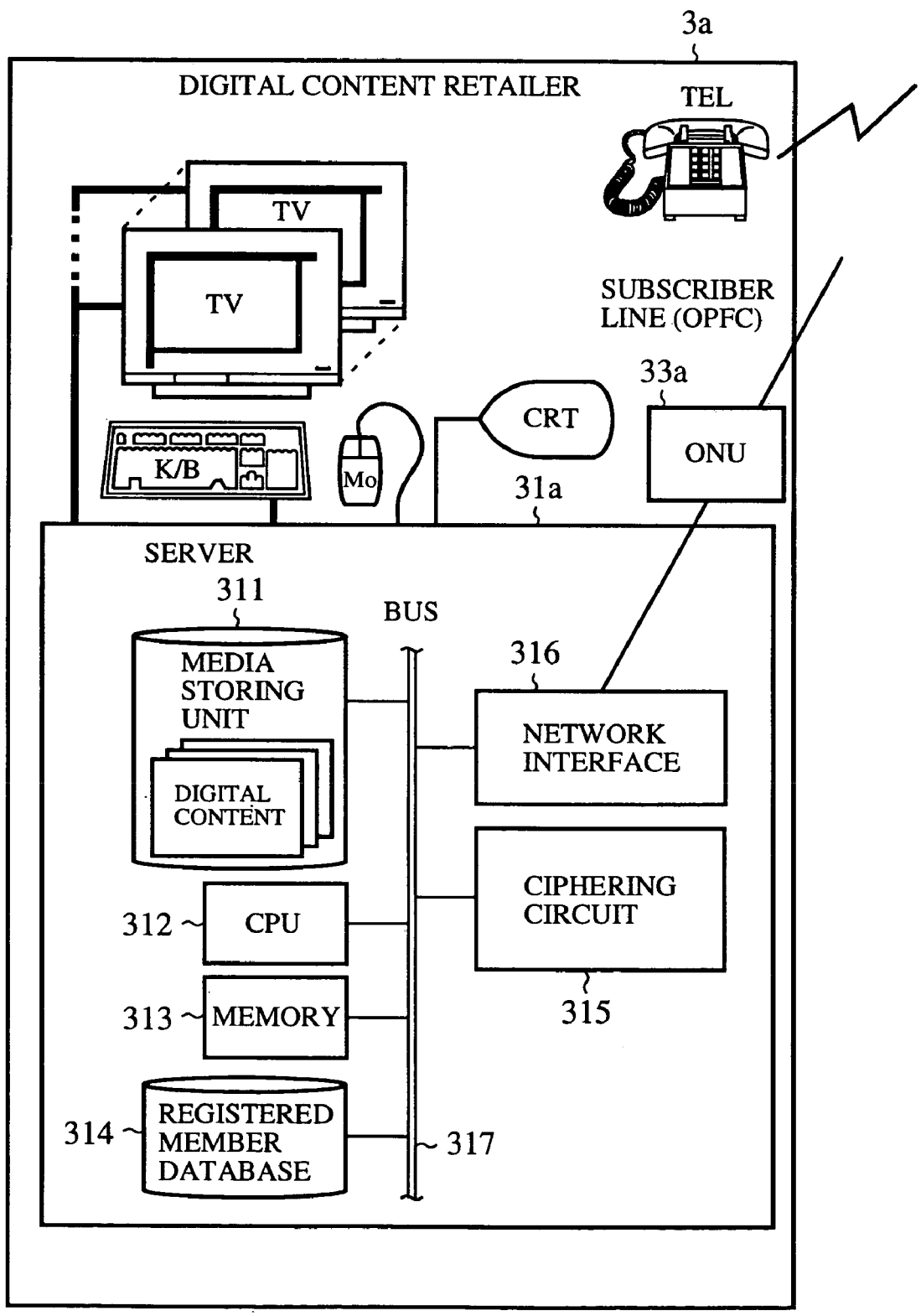
FIG. 4 is a block diagram of a server possessed by a digital content retailer.

FIG. 4 is a block diagram of the server 31a possessed by the digital content retailer 3a. The server 31a represents the servers 31a and 31b possessed by the digital content retailers 3a and 3b.

In FIG. 4, a reference numeral 311 indicates a media storing unit, having a large data capacity, for storing digital content as services, a reference numeral 312 indicates a central processing unit (CPU) for controlling the server 31a, a reference numeral 313 indicates a memory for storing data to be used for the operation of the CPU 312, a reference numeral 314 indicates a registered member data base for storing member's numbers to be used to recognize the registered members, a reference numeral 315 indicates a ciphering circuit for ciphering digital content to be downloaded to registered members, a reference numeral 316 indicates a network interface, a reference numeral 317 indicates a bus of the server 31a, and the reference numeral 12a indicates the digital service unit (DSU) for connecting the network interface 316 to a subscriber line OPFC of the optical fiber.

Also, the server 31a is connected to a plurality of peripheral apparatuses such as a keyboard K/B, a mouse Mo, a display CRT and a plurality of home televisions TV for monitoring the digital content to be downloaded. Also, a telephone TEL is arranged to receive a request by one registered member (or one consumer) or to communicate with the network operators 2a, 2b and 2c of the backbone networks 21a, 21b and 21c and the consumers 1a, 1b and 1c.

Next, an operation of the digital content downloading system using the network is described.

Figure 5:
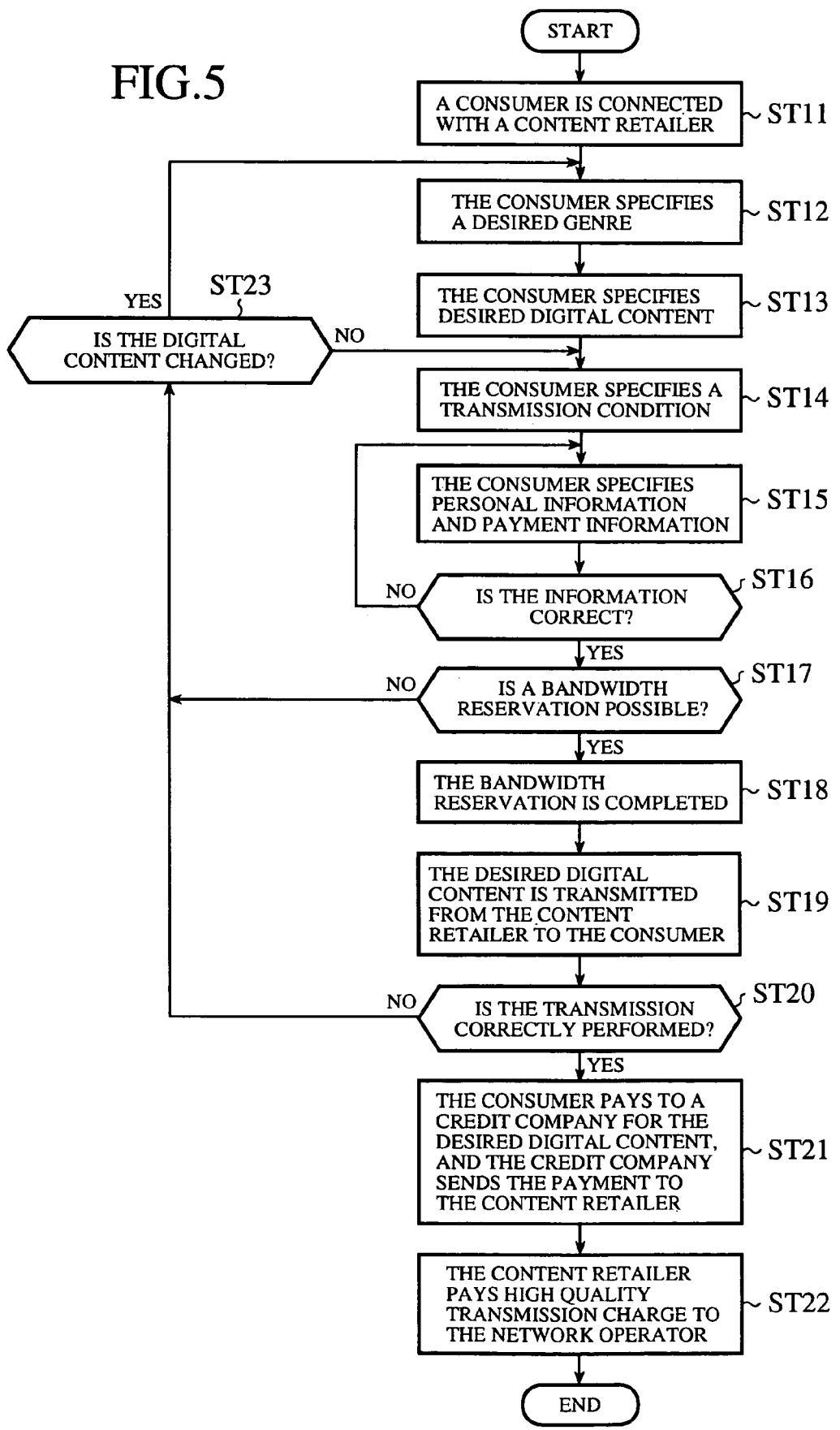
FIG. 5 is a flow chart showing a procedure performed in the digital content downloading system using the network according to the first embodiment.
Figure 6:
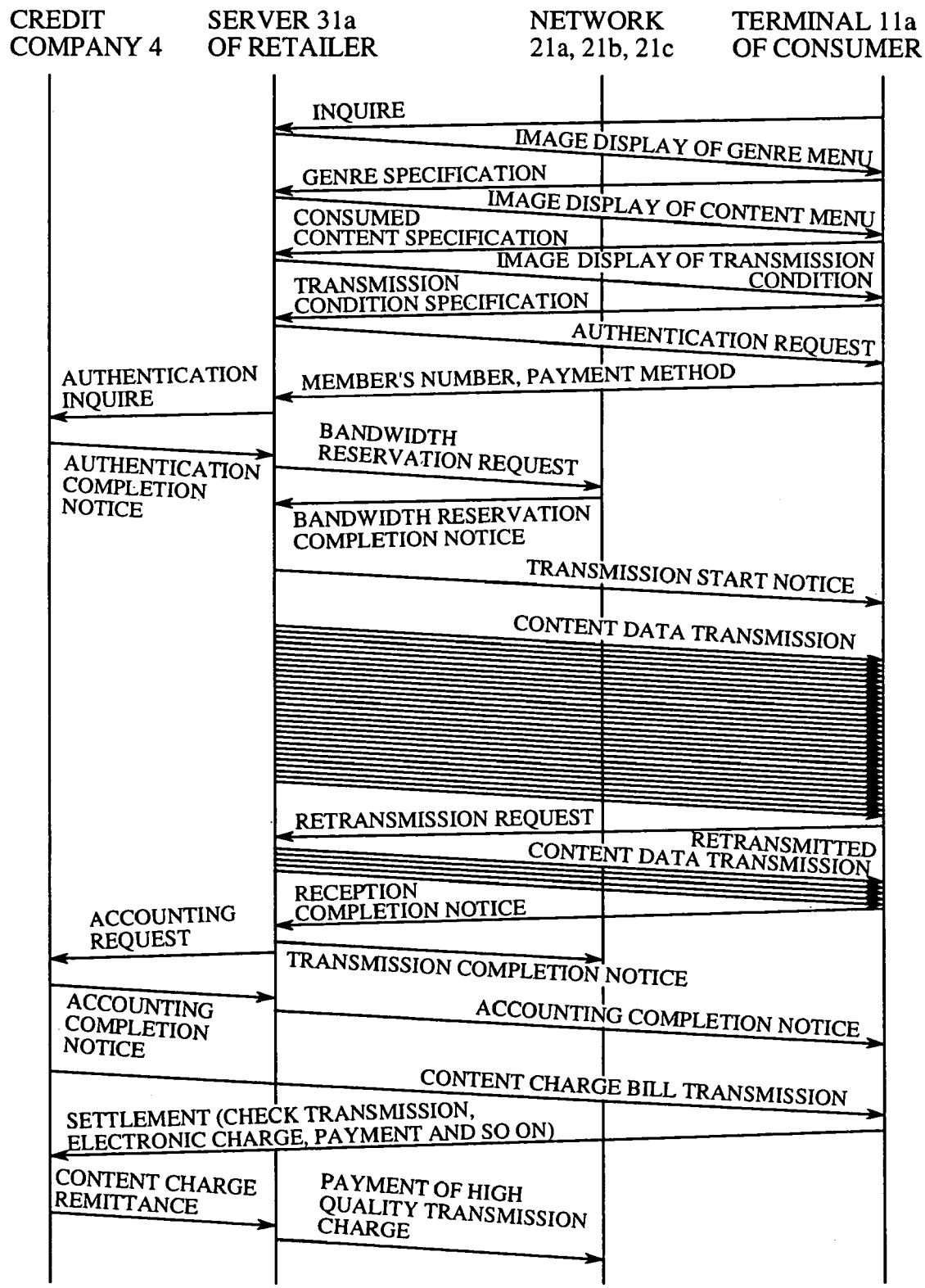
FIG. 6 is a diagram showing data transmission and reception performed successfully among a credit company, a digital content retailer, backbone networks and a consumer according to the procedure shown in FIG. 5.

FIG. 5 is a flow chart showing a procedure performed in the digital content downloading system using the network according to the first embodiment. FIG. 6 is a diagram showing data transmission and reception performed successfully among the credit company 4, the server 31a of the digital content retailer 3a, the group of backbone networks 21a, 21b and 21c and the terminal 11a of the consumer 1a according to the procedure shown in FIG. 5. Hereinafter, the procedure performed until the consumer 1a desiring the downloading of digital content receives the digital content is described with reference to FIG. 5 to FIG. 13.

Figure 7:
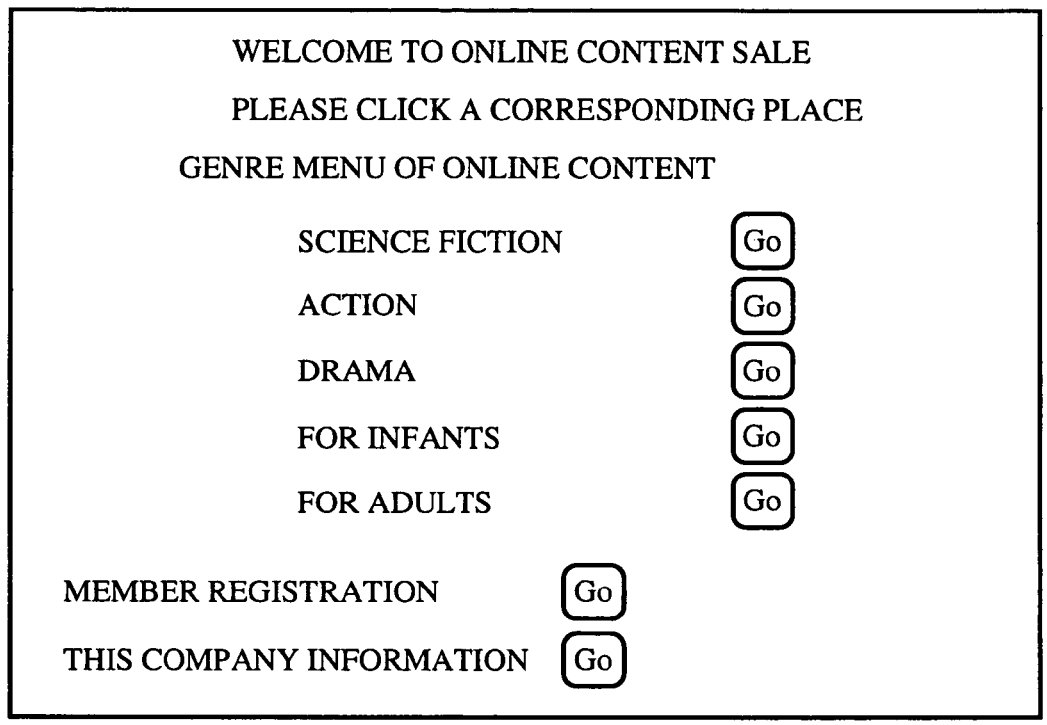
FIG. 7 is a diagram showing an example of an image of a genre menu.

In a step ST11 of FIG. 5, when the terminal 11a of the consumer 1a is connected to the server 31a of the digital content retailer 3a through the backbone networks 21a, 21b and 21c, a genre menu of digital content is sent from the server 31a of the digital content retailer 3a to the terminal 11a of the consumer 1a to display the genre menu on the television TV. FIG. 7 is a diagram showing an example of an image of the genre menu displayed on the television TV.

Figure 8:
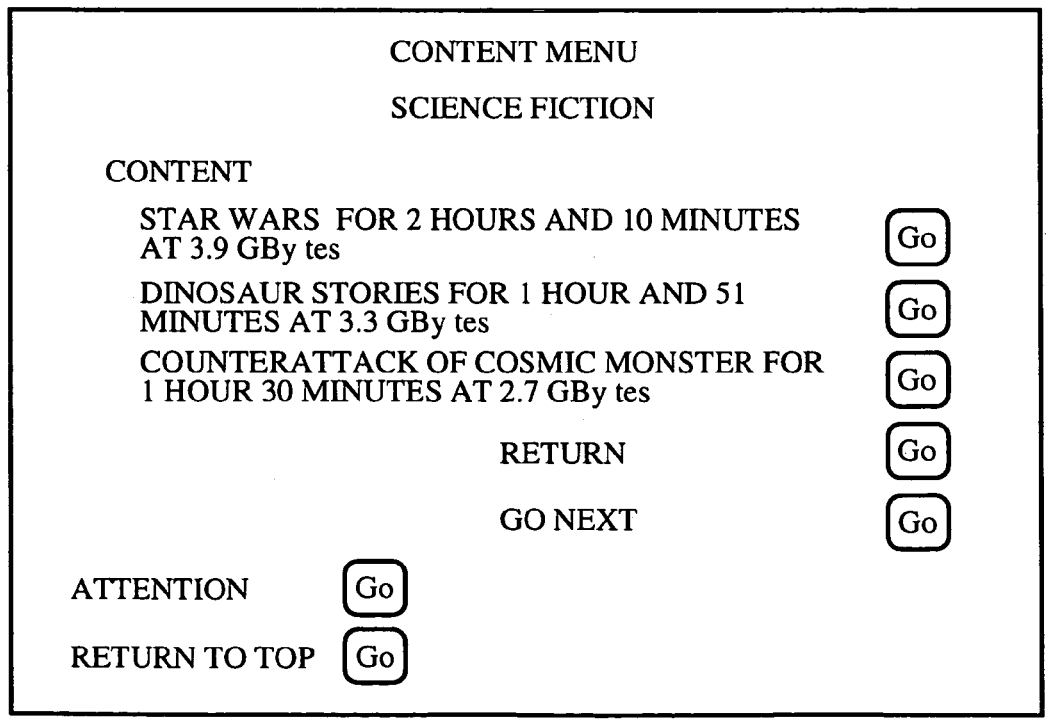
FIG. 8 is a diagram showing an example of an image of a content menu of a "science fiction"

In a step ST12, the consumer 1a specifies a desired genre, for example "science fiction", from the genres of the genre menu shown in FIG. 7, and the desired genre is sent to the server 31a of the digital content retailer 3a. Therefore, a content menu of the desired genre "science fiction" specified by the consumer 1a is sent from the server 31a of the digital content retailer 3a to the terminal 11a of the consumer 1a. FIG. 8 is a diagram showing an example of an image of the content menu of the "science fiction" displayed on the television TV.

In a step ST13, digital content of the content menu of the desired genre "science fiction" shown in FIG. 8 are displayed on the television TV, the consumer 1a specifies a desired digital content, for example "counterattack of cosmic monster", from the digital content listed in the content menu of the "science fiction", and the consumer 1a sends information designating the desired digital content "counterattack of cosmic monster" to the digital content retailer 3a. Therefore, a transmission condition menu of the desired digital content "counterattack of cosmic monster" is sent from the server 31a of the digital content retailer 3a to the terminal 11a of the consumer 1a.

FIG. 9 is a diagram showing an example of an image of a transmission condition menu used to specify a transmission condition for the digital content "counterattack of cosmic monster".

As shown in FIG. 9, a bandwidth guarantee type transmission condition, in which a short transmission time period is guaranteed, and a bandwidth no-guarantee type transmission condition, in which a transmission time period is not guaranteed, are prepared in the transmission condition menu. Here, the CBR class denotes a bandwidth allocation method in which a prescribed bandwidth (or a transfer rate) is allocated with a time condition (or a date condition) to each virtual circuit (VC). The ABR class denotes a bandwidth allocation method in which the transmission bandwidth allocated to each virtual circuit (VC) is dynamically adjusted according to a bandwidth remaining in the subscriber lines of the backbone networks $21a$, $21b$ and $21c$ or a buffer. The UBR class denotes a bandwidth allocation method in which the bandwidth (or the transfer rate) allocated to each virtual circuit (VC) cannot be specified, so that a burst transmission using a bandwidth remaining in the subscriber lines of the backbone networks $21a$, $21b$ and $21c$ or a buffer is performed in the UBR class.

As is described above, each transmission condition of the transmission condition menu corresponds to a communication quality of each digital content transmitting through the backbone networks $21a$, $21b$ and $21c$, and the communication quality is determined according to transmission conditions (for example, a data transfer rate (or a bandwidth), a delay time, a delay variation, a burst size, a cell interval, a cell discard rate and so on) of the digital content transmitting through the backbone networks $21a$, $21b$ and $21c$. The charge for the downloading of one digital content becomes higher as the communication quality of the digital content becomes high. For example, charges for the data transmission at the bandwidth guarantee type transmission conditions are higher than charges for the data transmission at the bandwidth no-guarantee type transmission conditions, and a charge for the data transmission at the bandwidth guarantee type transmission conditions and the bandwidth no-guarantee type transmission conditions becomes higher as a data transmission time period is shortened.

Also, one of time conditions such as an urgent transmission condition, a date and time specified transmission condition, a date specified transmission condition and so on can be specified as the transmission condition.

In a step ST14, the consumer $1a$ specifies a desired transmission condition selected from transmission conditions of the transmission condition menu shown in FIG. 9, and the consumer $1a$ sends the desired transmission condition to the digital content retailer $3a$. Therefore, an authentication request is sent from the server $31a$ of the digital content retailer $3a$ to the terminal $11a$ of the consumer $1a$. FIG. 10 is a diagram showing an example of an authentication image sent as an authentication request to the terminal $11a$ of the consumer $1a$.

In a step ST15, the consumer $1a$ specifies personal information such as a member's number and payment information such as a payment method, while using the authentication image of FIG. 10 sent as the authentication request, to log-in to the server $31a$ of the digital content retailer $3a$, the personal information and the payment information specified by the consumer $1a$ are sent to the server $31a$ of the digital content retailer $3a$, and an authentication request for the personal information and the payment information is sent from the server $31a$ of the digital content retailer $3a$ to the credit company 4 to inquire of the credit company 4 whether or not the personal information and the payment information specified by the consumer $1a$ are correct.

In a step ST16, it is judged in the credit company 4 whether or not the personal information and the payment information specified by the consumer $1a$ are correct. In cases where the personal information and the payment information of the consumer $1a$ are correct, an authentication completion notice is sent from the credit company 4 to the digital content retailer $3a$.

In a step ST17, in cases where the authentication completion notice sent from the credit company 4 is received in the server $31a$ of the digital content retailer $3a$, the server $31a$ of the digital content retailer $3a$ sends a request of a bandwidth reservation of the subscriber lines of the backbone networks $21a$, $21b$ and $21c$ to the network operators $2a$, $2b$ and $2c$ to transmit the desired digital content at the desired transmission condition specified by the consumer $1a$ to the consumer $1a$.

FIG. 11 is a diagram showing a procedure for the bandwidth reservation. In FIG. 11, reference numerals $22a$, $22b$ and $22c$ indicate a plurality of resource reservation servers of the backbone networks $21a$, $21b$ and $21c$ arranged in series. As shown in FIG. 11, when the server $31a$ of the digital content retailer $3a$ inquires of the resource reservation servers $22a$, $22b$ and $22c$ whether or not the bandwidth reservation of the subscriber lines of the backbone networks $21a$, $21b$ and $21c$ is possible at a data transfer rate (or a bandwidth) of 100 Mb/s for 10 minutes from 10:00 pm on Apr. 6, 2000, a notice that the bandwidth reservation in the resource reservation servers $22a$ and $22b$ is possible but the bandwidth reservation in the resource reservation server $22c$ is impossible is sent from the backbone networks $21a$, $21b$ and $21c$ to the server $31a$ of the digital content retailer $3a$. Therefore, in a step S23 of FIG. 5, a notice that the bandwidth reservation is impossible is sent from the server $31a$ of the digital content retailer $3a$ to the terminal $11a$ of the consumer $1a$, and the digital content retailer $3a$ inquires of the consumer $1a$ whether or not the consumer $1a$ changes the desired digital content to another one.

In cases where the consumer $1a$ does not change the desired digital content, the consumer $1a$ specifies another desired transmission condition in the step ST14, the authentication of the consumer $1a$ is confirmed in the steps ST15 and ST16. Thereafter, in the step S17, as shown in FIG. 11, the server $31a$ of the digital content retailer $3a$ again inquires of the resource reservation servers $22a$, $22b$ and $22c$ whether or not the bandwidth reservation of the subscriber lines of the backbone networks $21a$, $21b$ and $21c$, is possible at a data transfer rate of 50 Mb/s for 20 minutes from 10:00 pm on Apr. 6, 2000.

Thereafter, in a step S18, the bandwidth reservation is accepted in the resource reservation servers $22a$, $22b$ and $22c$, the bandwidth reservation is successfully completed, and a bandwidth reservation completion notice is sent from the resource reservation servers $22a$, $22b$ and $22c$ to the server $31a$ of the digital content retailer $3a$.

In a step ST19, the server $31a$ of the digital content retailer $3a$ sends a transmission start notice to the terminal $11a$ of the consumer $1a$, the desired digital content is ciphered in the ciphering circuit 315 of the server $31a$ shown in FIG. 4, and ciphered data of the desired digital content is downloaded to the terminal $11a$ of the consumer $1a$ through the network interface 316, the digital service units (DSU) $12a$ and the backbone networks $21c$, $21b$ and $21a$. In cases where all pieces of ciphered data of the desired digital content are not downloaded to the terminal $11a$ of the consumer $1a$, as shown in FIG. 6, a re-transmission request is sent from the terminal 11a to the server 31a, so that pieces of ciphered data of the desired digital content not yet downloaded are sent from the server 31a to the terminal 11a of the consumer 1a.

In the downloading of the desired digital content in the step ST19, it is preferred that the digital content retailer 3a sends a request to the consumer 1a through the networks 21c, 21b and 21a prior to the transmission of the desired digital content to make the consumer 1a check whether or not a capacity of the media storing unit 111 of the consumer 1a is sufficient to store the desired digital content. In this case, when a reply indicating that the data capacity of the media storing unit 111 of the consumer 1a is sufficient to store the desired digital content is received from the terminal 11a, because the digital content retailer 3a confirms that the consumer 1a has a capability for receiving the desired digital content, the downloading of the desired digital content to the consumer 1a is started. In addition, it is preferred that the server 31a of the digital content retailer 3a checks other capabilities of the terminal 11a to judge whether or not the terminal 11a can receive the desired digital content.

Thereafter, in a step ST20 of FIG. 5, the ciphered data of the desired digital content is deciphered in the ciphered data deciphering circuit 115 of the terminal 11a, and the desired digital content deciphered is stored in the media storing unit 111. Thereafter, it is checked in the CPU 112 whether or not the desired digital content is correctly downloaded to the terminal 11a. In cases where the desired digital content is not correctly downloaded, the consumer 1a judges in the step ST23 whether or not the desired digital content is changed to another one. In cases where the consumer 1a desires to change the desired digital content to another one, the steps ST12 to ST20 are repeated. In contrast, in cases where the consumer 1a desires not to change the desired digital content, the steps ST14 to ST20 are repeated.

In cases where the desired digital content is successfully downloaded in the step ST20, a reception completion notice is sent from the terminal 11a to the server 31a of the digital content retailer 3a, and a transmission completion notice is sent from the server 31a of the digital content retailer 3a to the resource reservation servers 22a, 22b and 22c of the backbone networks 21c, 21b and 21a.

In a step ST21, an accounting request based on the transmission of the desired digital content to the consumer 1a is sent from the server 31a of the digital content retailer 3a to the credit company 4, an accounting of the transmission of the desired digital content is performed in the credit company 4, an accounting completion notice is sent from the credit company 4 to the server 31a of the digital content retailer 3a, and the accounting completion notice is sent from the server 31a of the digital content retailer 3a to the terminal 11a of the consumer 1a. Thereafter, because one of the bandwidth guarantee type transmission conditions is selected as the desired transmission condition by the consumer 1a, a digital content bill, in which a charge for the desired digital content itself and a high quality transmission charge corresponding to the desired digital content transmission condition are written, is sent from the credit company 4 to the terminal 11a of the consumer 1a, the consumer 1a pays the charge for the desired digital content itself and the high quality transmission charge to the credit company 4 by using the terminal 11a to settle an account with the digital content retailer 3a, and the credit company 4 sends the payment of the consumer 1a corresponding to the charge for the desired digital content itself and the high quality transmission charge to the server 31a of the digital content retailer 3a.

In a step ST22, the digital content retailer 3a pays the high quality transmission charge to the network operators 2a, 2b and 2c. This high quality transmission charge differs from a line access charge for the use of the subscriber lines of the backbone networks 21a, 21b and 21c, and the line access charge for the use of the subscriber lines is paid to the network operators 2a, 2b and 2c by the consumer 1a.

Figure 12:
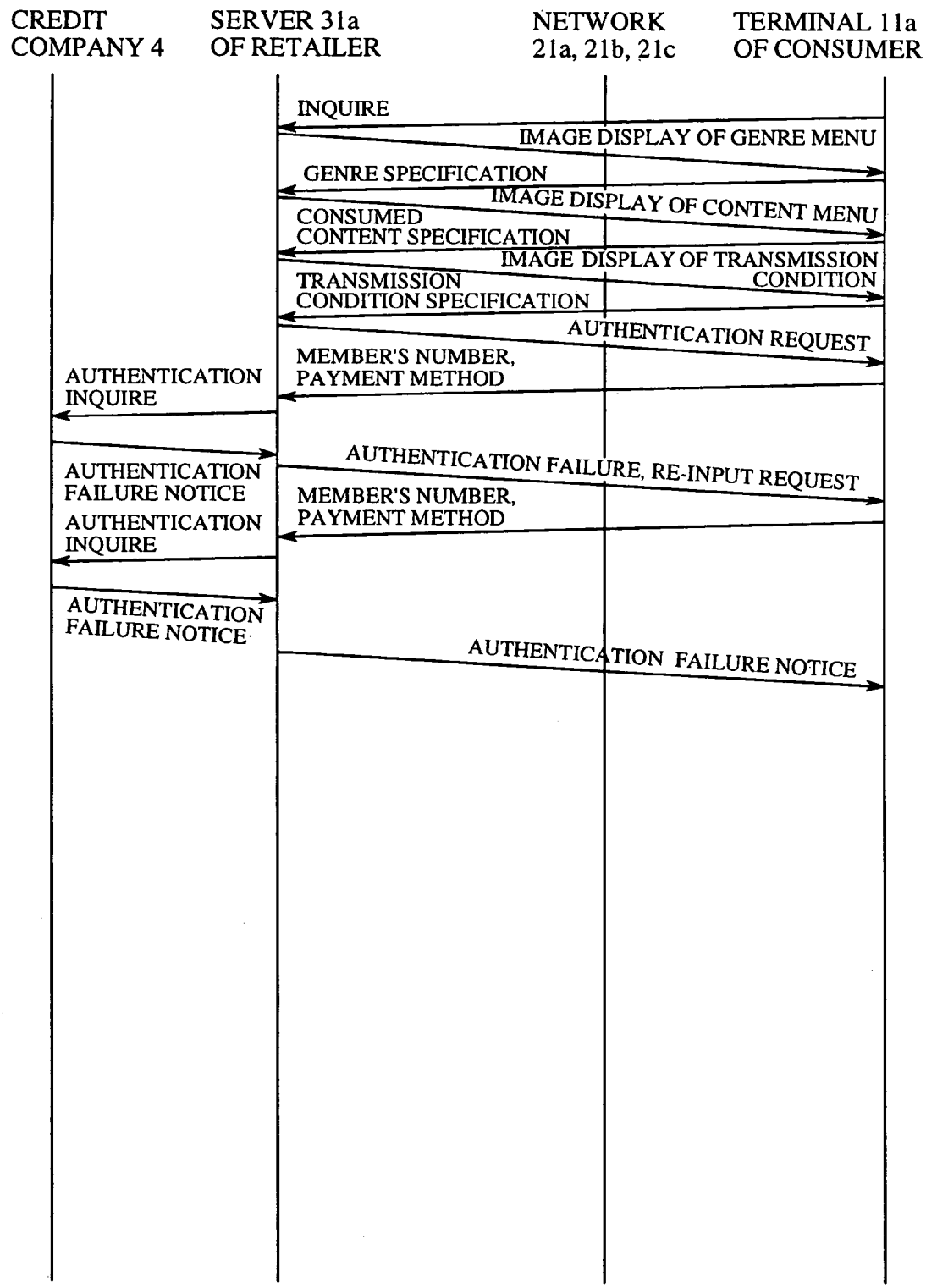
FIG. 12 is a diagram showing a procedure performed in cases where the credit company fails in the authentication of the consumer.

FIG. 12 is a diagram showing a procedure performed in cases where the credit company 4 fails in the authentication of the consumer 1a in the step ST16.

In cases where it is judged by the credit company 4 that the personal information and the payment information of the consumer 1a are not correct when the credit company 4 performs the authentication of the consumer 1a in the step ST16, an authentication failure notice is sent from the credit company 4 to the server 31a of the digital content retailer 3a, and the authentication failure and a request by the authentication are sent from the server 31a of the digital content retailer 3a to the terminal 11a of the consumer 1a. Thereafter, the consumers 1a again sends personal information and payment information to the server 31a of the digital content retailer 3a, and the server 31a of the digital content retailer 3a again inquires of the credit company 4 whether or not the personal information and the payment information again sent from the consumer 1a are correct. In cases where it is judged by the credit company 4 that the personal information and the payment information of the consumer 1a are correct, the authentication completion notice is sent from the credit company 4 to the digital content retailer 3a, and the step ST 17 is performed. In contrast, in cases where it is again judged by the credit company 4 that the personal information and the payment information again sent from the consumer 1a are not correct, the authentication failure notice is again sent from the credit company 4 to the server 31a of the digital content retailer 3a, and the authentication failure notice is sent from the server 31a of the digital content retailer 3a to the terminal 11a of the consumer 1a.

Figure 13:
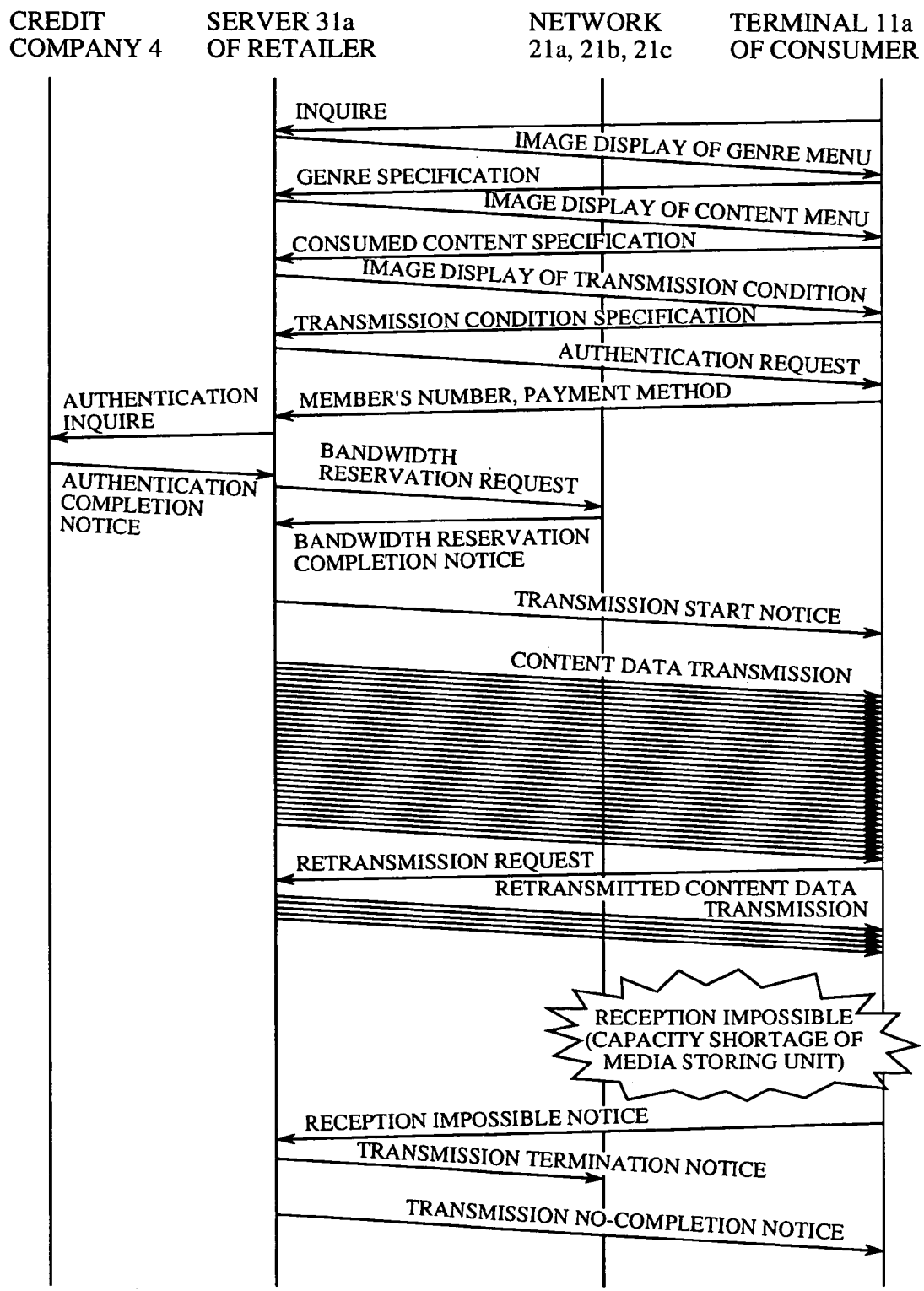
FIG. 13 is a diagram showing a procedure performed in cases where the failure of the downloading of a desired digital content occurs.

FIG. 13 is a diagram showing a procedure performed in cases where the failure of the downloading of the desired digital content occurs.

In cases where an empty capacity of the media storing unit 111 of the terminal 11a is too small to store the desired digital content, when the ciphered data of the desired digital content is transmitted from the server 31a of the digital content retailer 3a to the terminal 11a of the consumer 1a in the step ST19, the terminal 11a of the consumer 1a fails in receiving the ciphered data of the desired digital content. In this case, a reception impossible notice is sent from the terminal 11a of the consumer 1a to the server 31a of the digital content retailer 3a, a transmission termination notice is sent from the server 31a to the networks 21c, 21b and 21a, and a reception no-completion notice is sent from the server 31a to the terminal 11a. Therefore, the digital content retailer 3a can confirm that the consumer 1a fails in receiving the desired digital content.

Accordingly, in the first embodiment, because the consumer 1a can select any of the time conditions composed of the urgent transmission condition, the date and time specified transmission condition, the date specified transmission condition and so on as a part of a digital content transmission condition, digital content desired to be urgently transmitted can be downloaded to the terminal 11a of the consumer 1a at the urgent transmission condition, digital content desired to be transmitted at a specified date and time can be downloaded to the terminal 11a of the consumer 1a at the date and time specified transmission condition, or digital content desired to be transmitted at a specified date can be downloaded to the terminal 11a of the consumer 1a at the date specified transmission condition. Therefore, because the backbone networks 21a, 21b and 21c are reserved by the digital content retailer 3a in advance at the digital content transmission condition including the time condition specified by the consumer 1a, the desired digital content can be reliably downloaded to the consumer 1a at the time condition. Accordingly, the downloading of the desired digital content through the backbone networks 21a, 21b and 21c without considering any time condition can be avoided even though one of the backbone networks 21a, 21b and 21c is burdened with the transmission of high volume data.

Also, the transmission charge corresponding to the digital content transmission condition can be set according to the communication quality depending on the digital content transmission condition (for example, a data transfer rate (or a bandwidth), a delay time, a delay variation, a burst size, a cell interval, a cell discard rate and so on) in the backbone networks 21a, 21b and 21c.

Also, in the first embodiment, in cases where the consumer 1a purchases the desired digital content from the digital content retailer 3a through the backbone networks 21a, 21b and 21c, the consumer 1a can specify the downloading of the desired digital content at a high quality transmission condition. Also, in this case, the credit company 4 collects in one lump the payment of the consumer 1a corresponding to the charge for the desired digital content itself and the high quality transmission charge, the credit company 4 pays the charges to the digital content retailer 3a, and the digital content retailer 3a pays the high quality transmission charge to the network operators 2a, 2b and 2c. Therefore, it is not required that the consumer 1a directly pays the high quality transmission charge to the network operators 2a, 2b and 2c, so that the payment of the consumer 1a can be efficiently performed.

Also, in the first embodiment, because the digital content retailer 3a transmits the desired digital content to the consumer 1a after the credit company 4 successfully authenticates the consumer 1a, the digital content retailer 3a can reliably collect the charge for the desired digital content itself from the consumer 1a.

Also, in the first embodiment, because the digital content retailer 3a can confirm the failure of the transmission of the desired digital content, it is not required that the consumer 1a proves the failure of the transmission of the desired digital content.

Also, in the first embodiment, because the data of the digital content is ciphered in the server 31a of the digital content retailer 3a and is downloaded through the backbone networks 21a, 21b and 21c, a probability that a user differing from the consumer 1a unjustly and illegally obtain the digital content can be reduced.

In the first embodiment, information designating the digital content desired by the consumer 1a, information designating the digital content transmission condition, the personal information and the payment information are sent through the subscriber lines FTTH. However, it is applicable that the above pieces of information be sent through operators of the telephones TEL shown in FIG. 3 and FIG. 4 and a telephone line. In this case, it is applicable that the digital content be downloaded to the consumer 1a according to a reservation accepted in the network operators.

Also, in the first embodiment, the terminals 11a, 11b and 11c of the consumers 1a, 1b and 1c are connected to the backbone network 21a through the subscriber lines FTTH. However, it is applicable that coaxial cables or radio-subscriber lines having the same or more superior performance as/to that of the coaxial cables be used in place of the subscriber lines FTTH.

Embodiment 2

Figure 14:
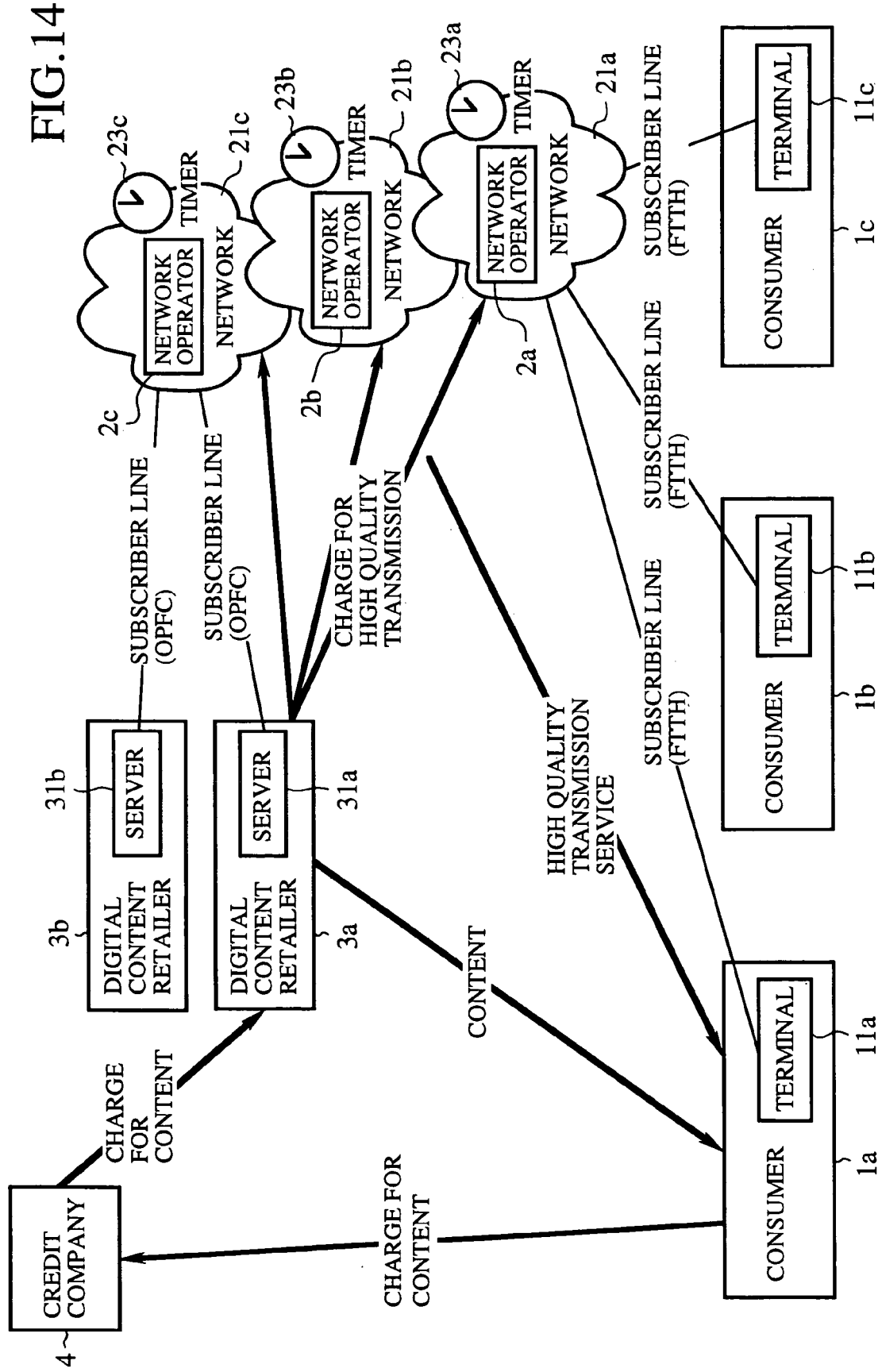
FIG. 14 is a diagram showing the configuration of a digital content downloading system using a network according to a second embodiment of the present invention.

FIG. 14 is a diagram showing the configuration of a digital content downloading system using a network according to a second embodiment of the present invention.

In FIG. 14, reference numerals 23a, 23b and 23c indicate a plurality of timers, arranged in the backbone networks 21a, 21b and 21c in one-to-one correspondence, for measuring a transmission time period from the sending of a transmission start notice to the sending of a transmission completion notice. The other configuration in FIG. 14 is the same as that shown in FIG. 1 of the first embodiment.

Next, an operation of the digital content downloading system according to the second embodiment is described.

Figure 15:
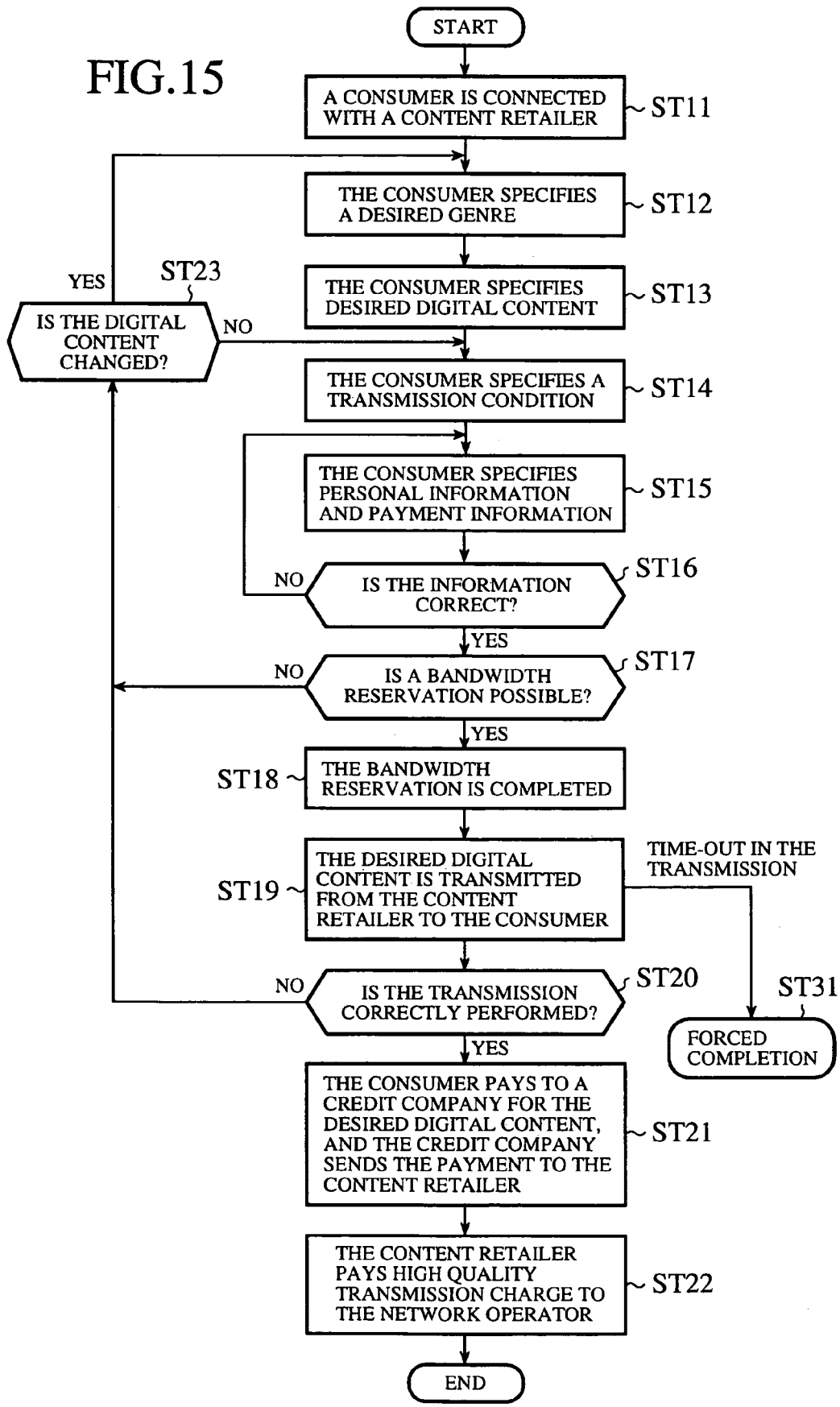
FIG. 15 is a flow chart showing a procedure performed in the digital content downloading system using the network according to the second embodiment.
Figure 16:
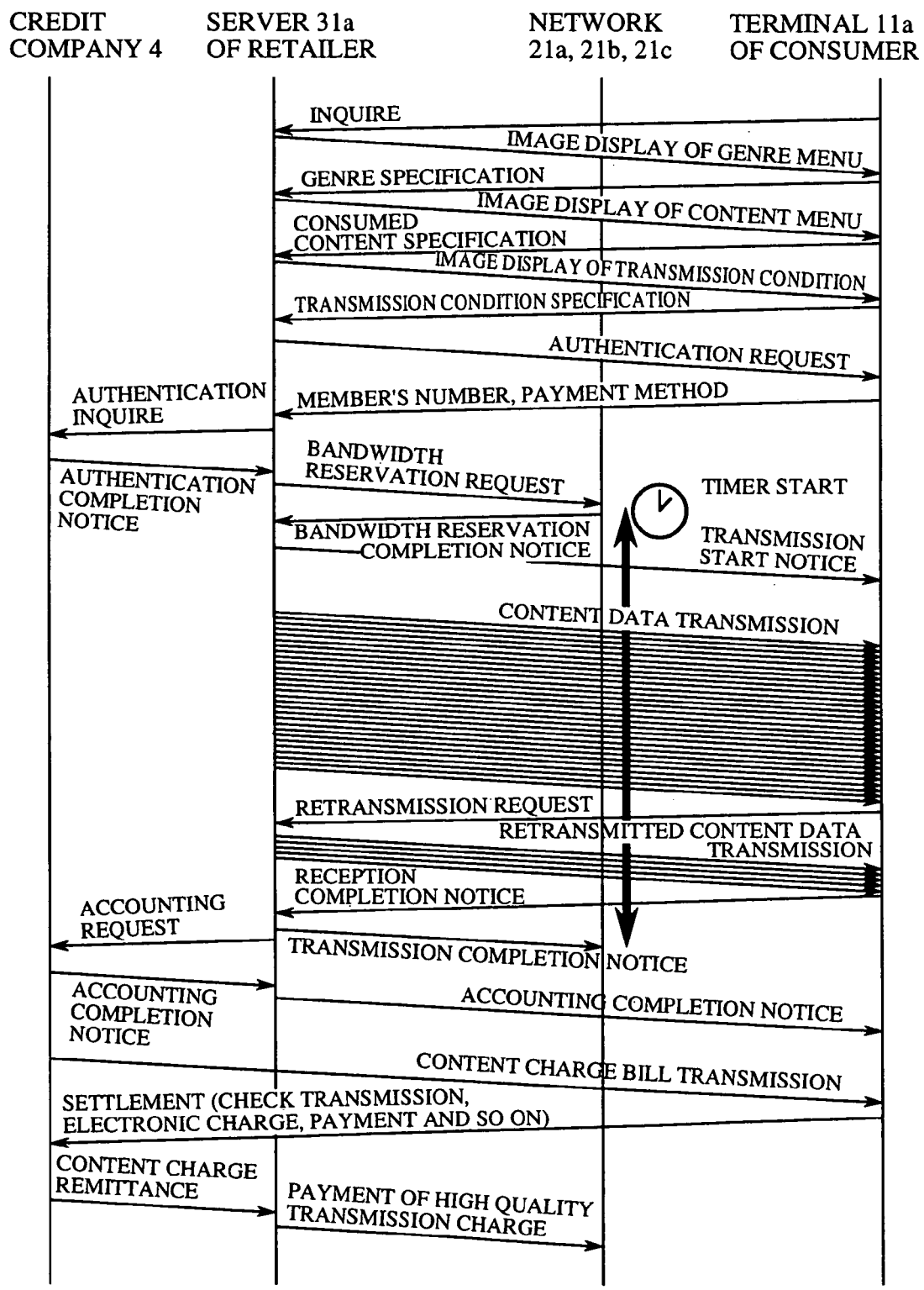
FIG. 16 is a diagram showing data transmission and reception performed successfully among a credit company, a digital content retailer, backbone networks and a consumer according to the procedure shown in FIG. 15.

FIG. 15 is a flow chart showing a procedure performed in the digital content downloading system using the network according to the second embodiment. FIG. 16 is a diagram showing data transmission and reception performed successfully among the credit company 4, the server 31a of the digital content retailer 3a, the group of backbone networks 21a, 21b and 21c and the terminal 11a of the consumer 1a according to the procedure shown in FIG. 15.

The steps ST11 to ST18 of FIG. 15 are performed in the same manner as those shown in FIG. 5 of the first embodiment.

In a step ST19, when a transmission start notice is sent from the server 31a of the digital content retailer 3a to the terminal 11a of the consumer 1a, in addition to the operation performed in the step ST19 of FIG. 5 according to the first embodiment, a time measuring operation of the timers 23c, 23b and 23a arranged in the backbone networks 21c, 21b and 21a is started. Therefore, the timers 23c, 23b and 23a indicate a transmission time period of digital content downloaded from the digital content retailer 3a to the consumer 1a.

Thereafter, in a step ST20, the operation in the step ST20 of FIG. 5 is performed according to the first embodiment. Also, when a transmission completion notice is sent from the server 31a of the digital content retailer 3a to the backbone networks 21c, 21b and 21a, the timers 23c, 23b and 23a are reset. Thereafter, the steps ST21 and ST22 of FIG. 15 are performed in the same manner as those shown in FIG. 5 of the first embodiment.

Figure 17:
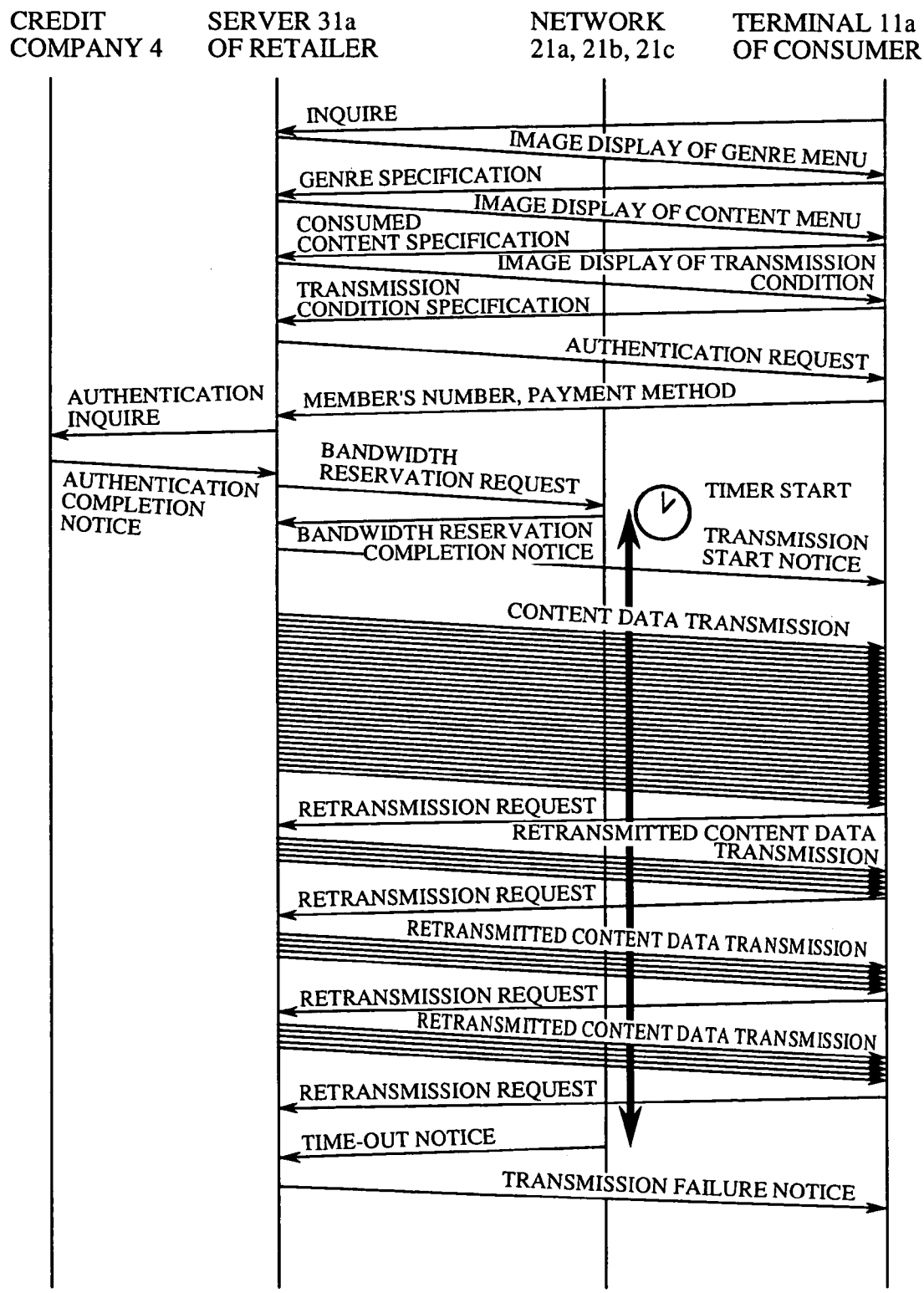
FIG. 17 is a diagram showing a procedure performed in cases where a transmission time period of digital content exceeds an allowable data transmission time period.

FIG. 17 is a diagram showing a procedure performed in cases where the transmission time period of the digital content exceeds an allowable data transmission time period.

When the transmission start notice is sent from the server 31a of the digital content retailer 3a to the terminal 11a of the consumer 1a in the step ST19 of FIG. 15, the time measuring operation of the timers 23c, 23b and 23a arranged in the backbone networks 21c, 21b and 21a is started. Thereafter, the data of the desired digital content is transmitted to the consumer 1a in the step ST19, and the data of the desired digital content not yet received is transmitted to the consumer 1a in response to a re-transmission request by the consumer 1a. In cases where the transmission of the desired digital content performed in response to the re-transmission request by the consumer 1a is repeated, the transmission time period indicated by the timers 23c, 23b and 23a exceeds an allowable data transmission time period set in the timers 23c, 23b and 23a in advance, so that a time-out of the transmission of the desired digital content is judged in the backbone networks 21c, 21b and 21a.

Thereafter, in a step ST31, a time-out notice is sent from the backbone networks 21c, 21b and 21a to the server 31a of the digital content retailer 3a, and the transmission of the desired digital content is forcedly terminated by the server 31a of the digital content retailer 3a, and a transmission failure notice is sent from the server 31a of the digital content retailer 3a to the terminal 11a of the consumer 1a.

Accordingly, in the second embodiment, in cases where the transmission time period of the desired digital content to be downloaded from the server 31a of the digital content retailer 3a to the terminal 11a of the consumer 1a exceeds the allowable data transmission time period set in the timers 23c, 23b and 23a in advance, the transmission of the desired digital content is forcedly terminated by the server 31a of the digital content retailer 3a. Therefore, the bandwidth of the backbone networks 21c, 21b and 21a can be efficiently used.

Also, in the second embodiment, in cases where the consumer 1a purchases the desired digital content through the backbone networks 21c, 21b and 21a, the consumer 1a can specify the downloading of the desired digital content at a high quality transmission condition. Also, in this case, the credit company 4 collects in one lump the payment of the consumer 1a corresponding to the charge for the desired digital content itself and the high quality transmission charge, the credit company 4 pays the charges to the digital content retailer 3a, and the digital content retailer 3a pays the high quality transmission charge to the network operators 2a, 2b and 2c. Therefore, it is not required that the consumer 1a directly pays the high quality transmission charge to the network operators 2a, 2b and 2c, so that the payment of the consumer 1a can be efficiently performed in the same manner as in the first embodiment.

Also, in the second embodiment, because the digital content retailer 3a transmits the desired digital content to the consumer 1a after the authentication of the consumer 1a is completed, the digital content retailer 3a can reliably collect the charge for the desired digital content itself from the consumer 1a in the same manner as in the first embodiment.

Also, in the second embodiment, because the digital content retailer 3a can confirm the failure of the transmission of the desired digital content, it is not required that the consumer 1a proves the failure of the transmission of the desired digital content in the same manner as in the first embodiment.

Also, in the second embodiment, because the data of the digital content is ciphered in the server 31a of the digital content retailer 3a and is downloaded through the backbone networks 21a, 21b and 21c, a probability that a user differing from the consumer 1a unjustly and illegally obtain the digital content can be reduced in the same manner as in the first embodiment.

Embodiment 3

Figure 18:
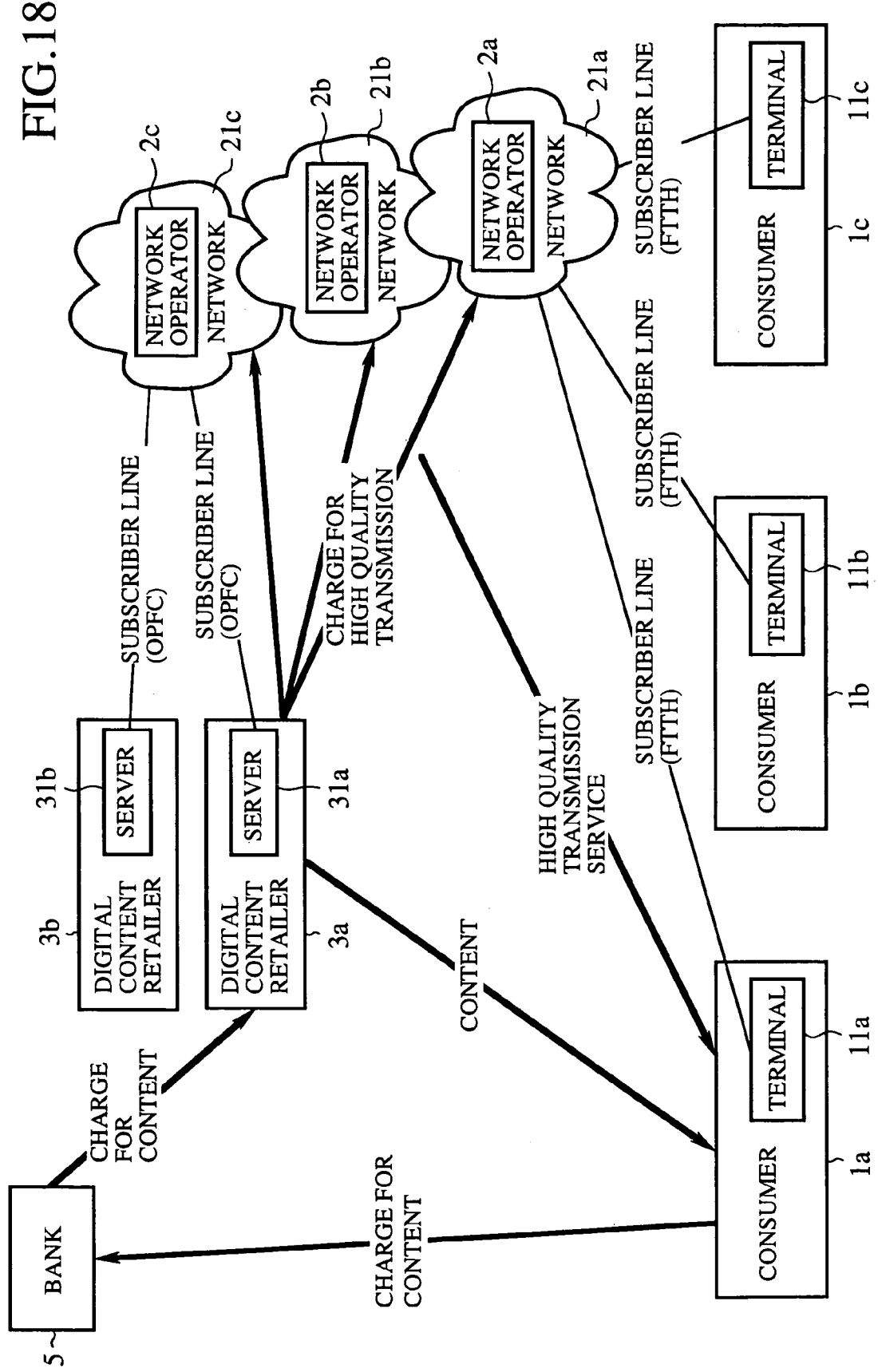
FIG. 18 is a diagram showing the configuration of a digital content downloading system using a network according to a third embodiment of the present invention.

FIG. 18 is a diagram showing the configuration of a digital content downloading system using a network according to a third embodiment of the present invention.

In FIG. 18, a reference numeral 5 indicates a bank for performing the authentication of the consumers 1a, 1b and 1c and performing the accounting relating to the provision of digital content downloaded to each consumer. The consumers 1a, 1b and 1c respectively have an account in the bank 5. The other configuration in FIG. 18 is the same as that shown in FIG. 1 of the first embodiment.

Next, an operation of the digital content downloading system according to the third embodiment is described.

Figure 19:
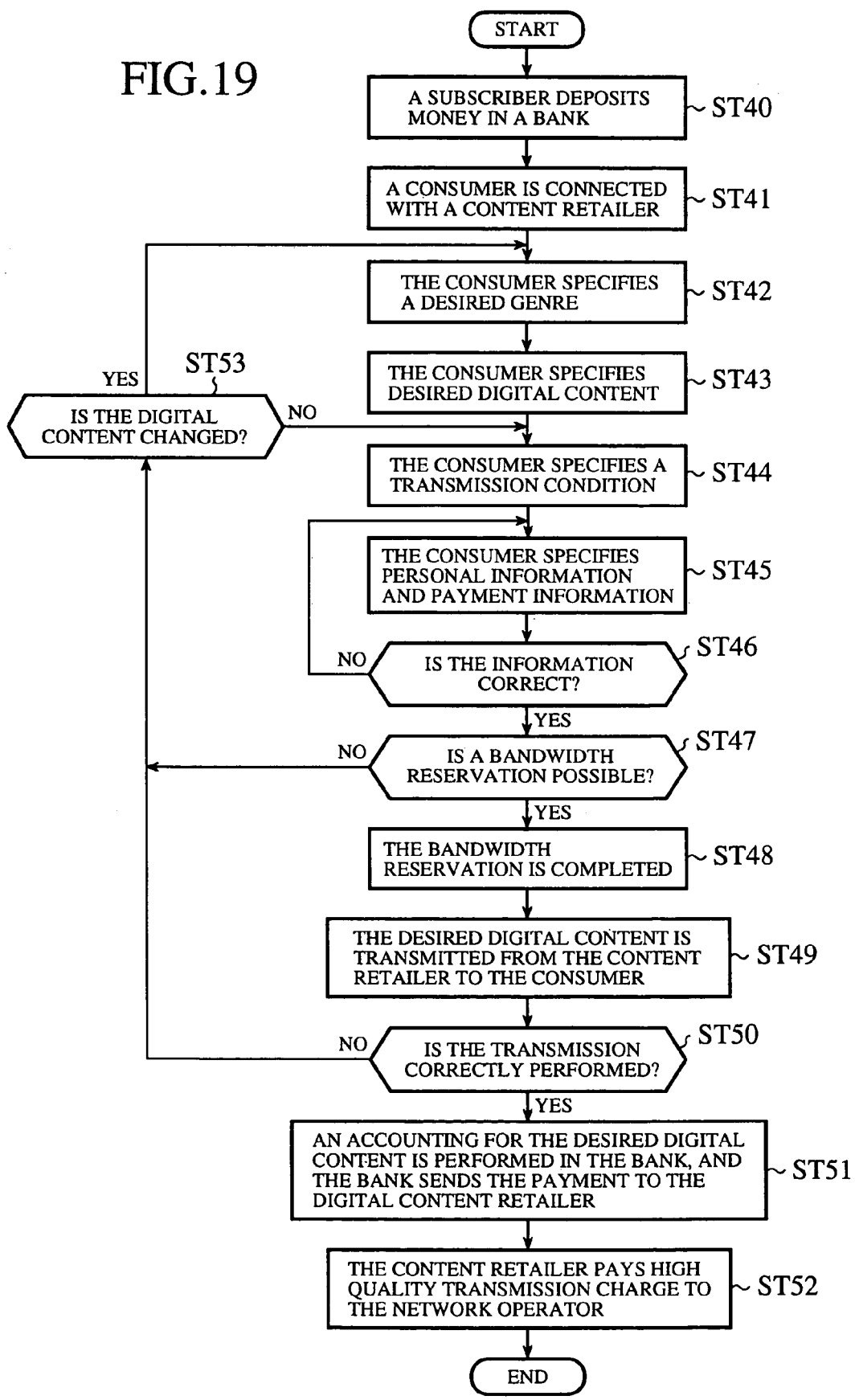
FIG. 19 is a flow chart showing a procedure performed in the digital content downloading system using the network according to the third embodiment.
Figure 20:
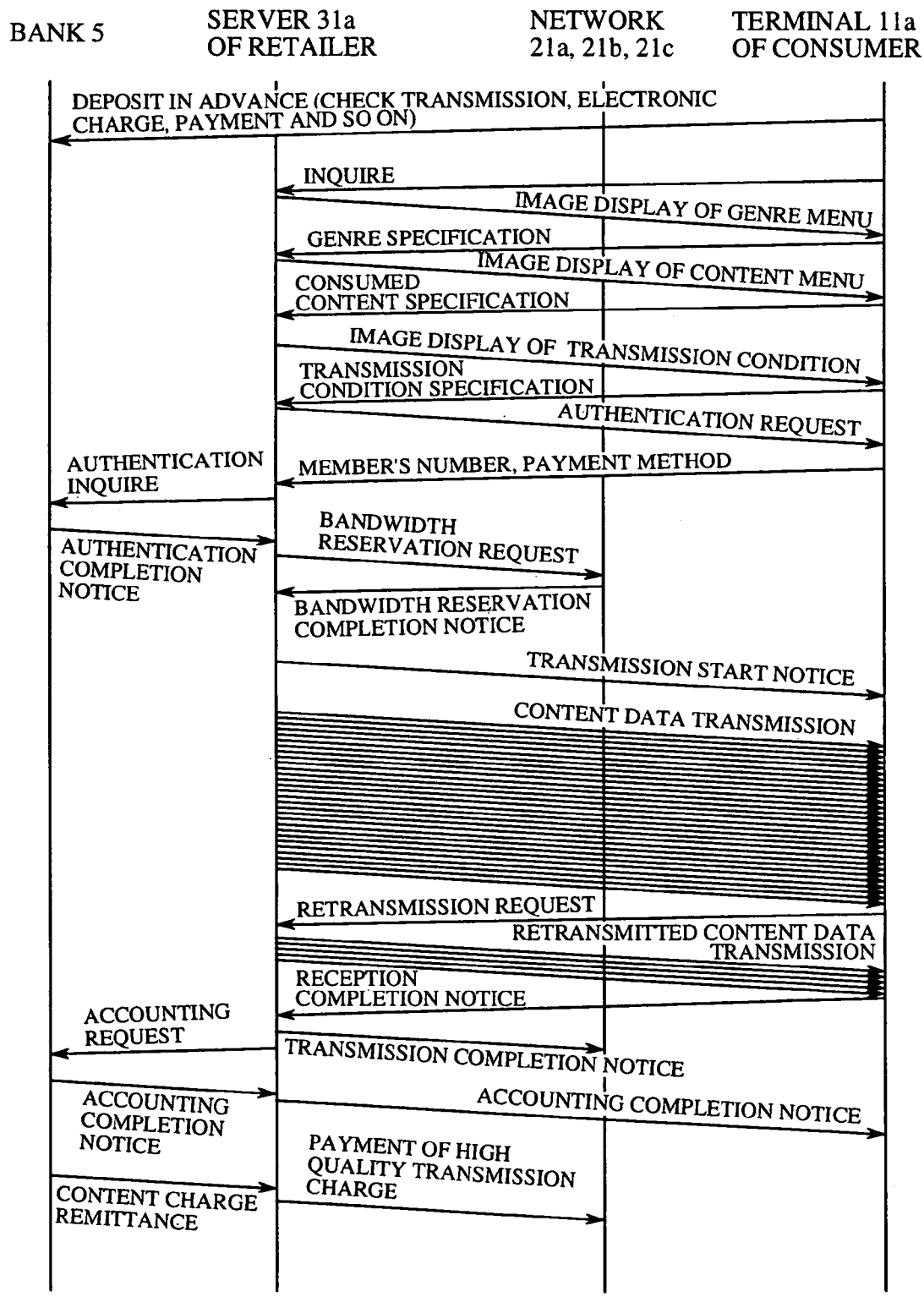
FIG. 20 is a diagram showing data transmission and reception performed successfully among a bank, a digital content retailer, backbone networks and a consumer according to the procedure shown in FIG. 19.

FIG. 19 is a flow chart showing a procedure performed in the digital content downloading system using the network according to the third embodiment. FIG. 20 is a diagram showing data transmission and reception performed successfully among the bank 5, the server 31a of the digital content retailer 3a, the group of backbone networks 21a, 21b and 21c and the terminal 11a of the consumer 1a according to the procedure shown in FIG. 19.

In a step ST40 of FIG. 19, the consumer 1a deposits money in his or her account of the bank 5. After the consumer 1a deposits the money in the bank 5, steps ST41 to ST44 of FIG. 19 are performed in the same manner as the steps ST11 to ST14 shown in FIG. 5 of the first embodiment.

Thereafter, in a step ST45, the consumer 1a specifies personal information such as a member's number and payment information such as a payment method, while using the authentication image of FIG. 10 sent as the authentication request, to log-in to the server 31a of the digital content retailer 3a, the personal information and the payment information specified by the consumer 1a are sent to the server 31a of the digital content retailer 3a, and an authentication request for the personal information and the payment information is sent from the server 31a of the digital content retailer 3a to the bank 5 to inquire of the bank 5 whether or not the personal information and the payment information specified by the consumer 1a are correct.

In a step ST46, it is judged in the bank 5 whether or not the personal information and the payment information specified by the consumer 1a are correct. In cases where the personal information and the payment information of the consumer 1a are correct, an authentication completion notice is sent from the bank 5 to the digital content retailer 3a.

Thereafter, steps ST47 to ST50 of FIG. 19 are performed in the same manner as the steps ST17 to ST20 shown in FIG. 5 of the first embodiment.

In cases where the desired digital content is successfully downloaded in the step ST50, a reception completion notice is sent from the terminal 11a of the consumer 1a to the server 31a of the digital content retailer 3a, and a transmission completion notice is sent from the server 31a of the digital content retailer 3a to the resource reservation servers 22a, 22b and 22c of the backbone networks 21a, 21b and 21c.

In a step ST51, an accounting request for the transmission of the desired digital content to the consumer 1a is transmitted from the server 31a of the digital content retailer 3a to the bank 5, an accounting for the transmission of the desired digital content is performed in the bank 5, an accounting completion notice is sent from the bank 5 to the server 31a of the digital content retailer 3a, and the accounting completion notice is sent from the server 31a of the digital content retailer 3a to the terminal 11a of the consumer 1a. Thereafter, the bank 5 collects a charge for the desired digital content itself and a high quality transmission charge corresponding to the desired digital content transmission condition from the account of the consumer 1a, and the bank 5 sends the charges collected from the account of the consumer 1a to the server 31a of the digital content retailer 3a.

In a step ST52, the digital content retailer 3a pays the high quality transmission charge to the network operators 2a, 2b and 2c. This high quality transmission charge differs from a line access charge for the use of the subscriber lines of the backbone networks 21a, 21b and 21c, and the line access charge for the use of the subscriber lines is paid to the network operators 2a, 2b and 2c by the consumer 1a.

Figure 21:
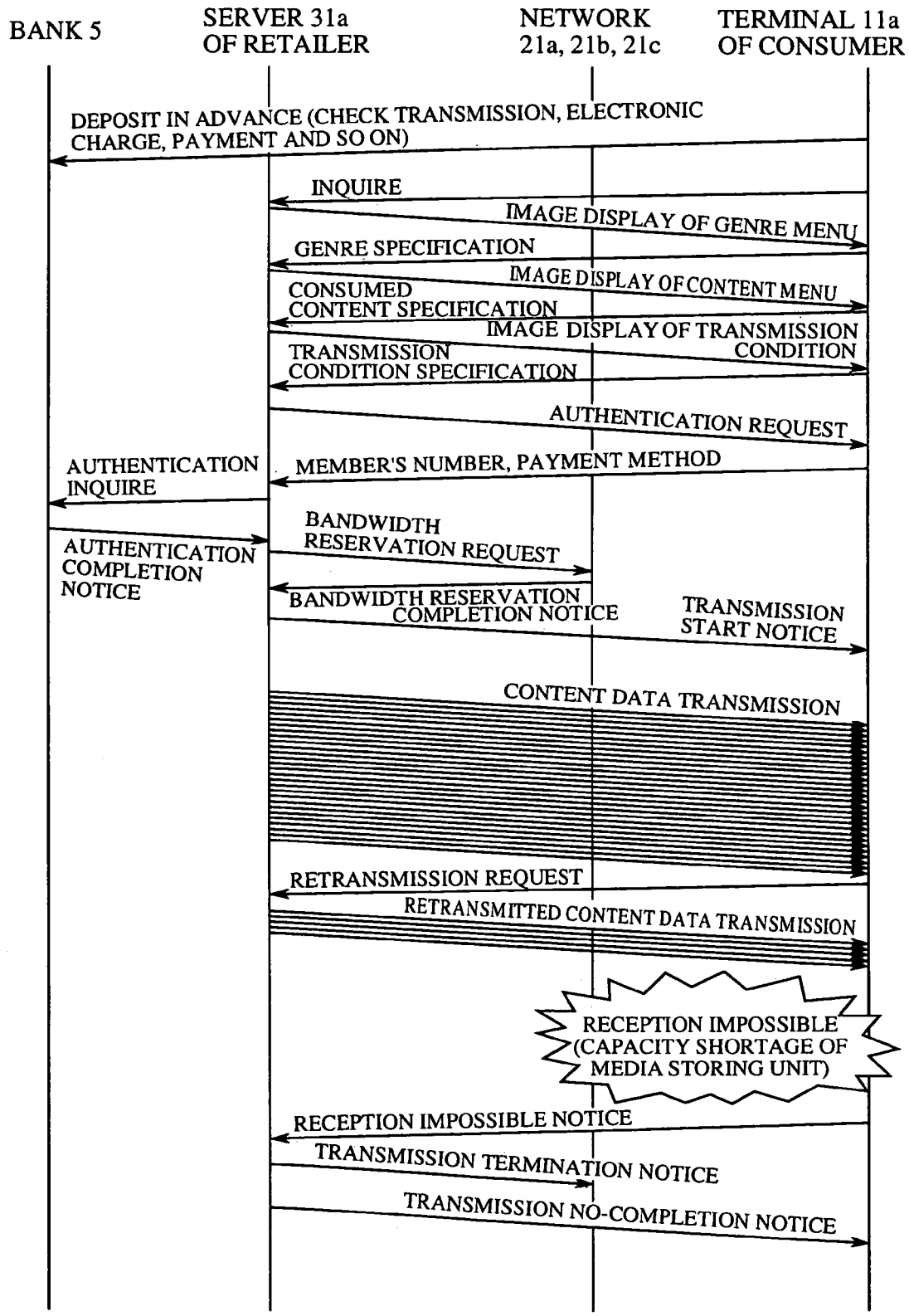
FIG. 21 is a diagram showing a procedure performed in cases where the failure of the downloading of a desired digital content occurs.

FIG. 21 is a diagram showing a procedure performed in cases where the failure of the downloading of the desired digital content occurs.

In cases where an empty capacity of the media storing unit 111 of the terminal 11a is too small to store the desired digital content, when the ciphered data of the desired digital content is transmitted from the server 31a of the digital content retailer 3a to the terminal 11a of the consumer 1a in the step ST49, the terminal 11a of the consumer 1a fails in receiving the ciphered data of the desired digital content. In this case, a reception impossible notice is sent from the terminal 11a of the consumer 1a to the server 31a of the digital content retailer 3a, a transmission termination notice is sent from the server 31a of the digital content retailer 3a to the networks 21c, 21b and 21a, and a reception no-completion notice is sent from the server 31a of the digital content retailer 3a to the terminal 11a. Therefore, the digital content retailer 3a can confirm that the consumer 1a fails in receiving the desired digital content.

Accordingly, in the third embodiment, in cases where the consumer 1a purchases the desired digital content from the digital content retailer 3a through the backbone networks 21a, 21b and 21c, the consumer 1a can specify the downloading of the desired digital content at a high quality transmission condition. Also, in this case, the bank 5 collects in one lump the charge for the desired digital content itself and the high quality transmission charge, the bank 5 pays the charges to the digital content retailer 3a, and the digital content retailer 3a pays the high quality transmission charge to the network operators 2a, 2b and 2c of the backbone networks 21a, 21b and 21c. Therefore, it is not required that the consumer 1a directly pays the high quality transmission charge to the network operators 2a, 2b and 2c, so that the payment of the consumer 1a can be efficiently performed.

Also, in the third embodiment, because the consumer 1a deposits money in his or her account of the bank 5 in advance and because the digital content retailer 3a transmits the desired digital content to the consumer 1a after the bank 5 successfully authenticates the consumer 1a, the digital content retailer 3a can reliably collect the charge for the desired digital content itself from the consumer 1a.

Also, in the third embodiment, because the digital content retailer 3a can confirm the failure of the transmission of the desired digital content, it is not required that the consumer 1a proves the failure of the transmission of the desired digital content in the same manner as in the first embodiment.

Also, in the third embodiment, because the data of the digital content is ciphered in the server 31a of the digital content retailer 3a and is downloaded through the backbone networks 21a, 21b and 21c, a probability that a user differing from the consumer 1a unjustly and illegally obtain the digital content can be reduced in the same manner as in the first embodiment.

Also, in the third embodiment, in cases where the timers 23a, 23b and 23c are arranged in the backbone networks 21a, 21b and 21c, when the transmission time period of the desired digital content to be downloaded from the server 31a of the digital content retailer 3a to the terminal 11a of the consumer 1a exceeds the allowable data transmission time period set in the timers 23c, 23b and 23a, the transmission of the desired digital content is forcedly terminated by the server 31a of the digital content retailer 3a. Therefore, the bandwidth of the backbone networks 21c, 21b and 21a can be efficiently used in the same manner as in the second embodiment.

Embodiment 4

The configuration of a digital content downloading system using a network according to a fourth embodiment is the same as that shown in FIG. 18 of the third embodiment.

Next, an operation of the digital content downloading system according to the fourth embodiment is described.

Figure 22:
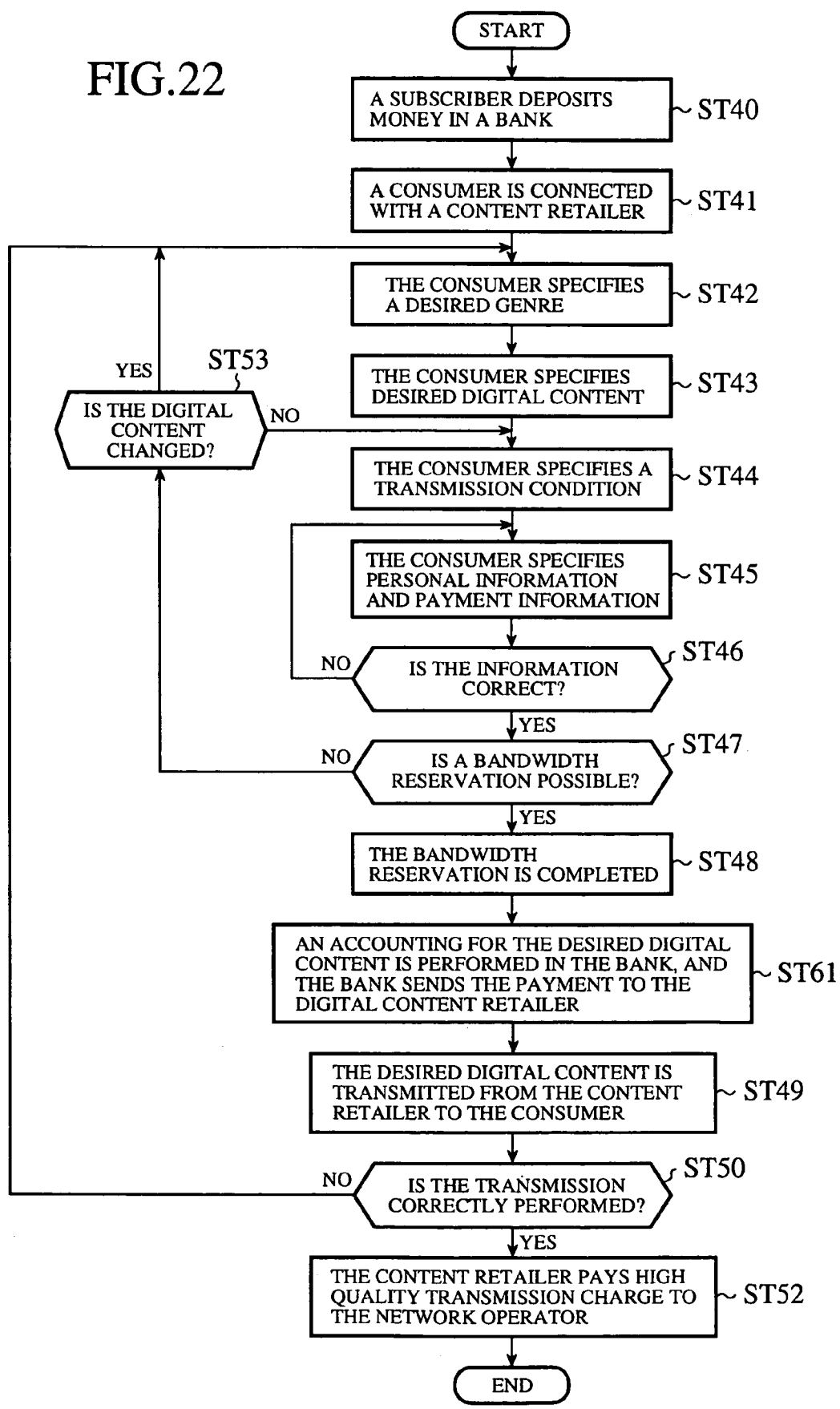
FIG. 22 is a flow chart showing a procedure performed in the digital content downloading system using the network according to a fourth embodiment of the present invention.
Figure 23:
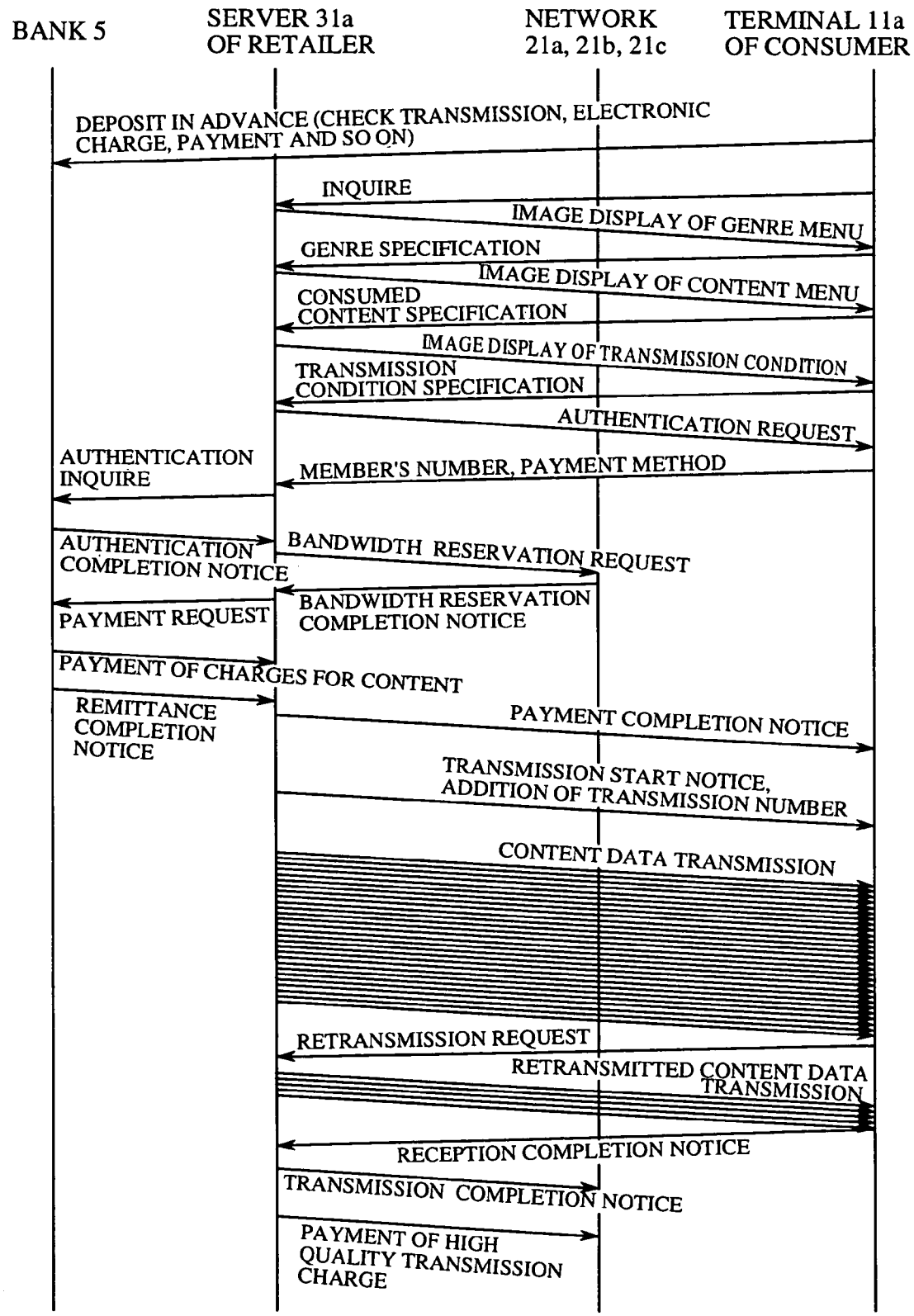
FIG. 23 is a diagram showing data transmission and reception performed successfully among a bank, a digital content retailer, backbone networks and a consumer according to the procedure shown in FIG. 22.

FIG. 22 is a flow chart showing a procedure performed in the digital content downloading system using the network according to a fourth embodiment of the present invention. FIG. 23 is a diagram showing data transmission and reception performed successfully among the bank 5, the server 31a of the digital content retailer 3a, the group of backbone networks 21a, 21b and 21c and the terminal 11a of the consumer 1a according to the procedure shown in FIG. 22.

Steps ST40 to ST48 of FIG. 22 are performed in the same manner as the steps ST40 to ST48 shown in FIG. 19 of the third embodiment.

Thereafter, in cases where the server 31a of the digital content retailer 3a receives the bandwidth reservation completion notice from the backbone networks 21a, 21b and 21c in the step ST48 after the bandwidth reservation is accepted in the resource reservation servers 22a, 22b and 22c of the backbone networks 21a, 21b and 21c, in a step ST61, a payment request is sent from the server 31a of the digital content retailer 3a to the bank 5, and the bank 5 collects the charge for the desired digital content itself and the high quality transmission charge from the account of the consumer 1a and pays the charge for the desired digital content itself and the high quality transmission charge to the digital content retailer 3a. Thereafter, the bank 5 sends a remittance completion notice to the digital content retailer 3a, and the digital content retailer 3a sends a payment completion notice to the terminal 11a of the consumer 1a in response to the remittance completion notice.

In a step ST49, the server 31a of the digital content retailer 3a sends a transmission start notice, to which a transmission number is attached, to the terminal 11a of the consumer 1a, data of the desired digital content is ciphered in the ciphering circuit 315 of the server 31a shown in FIG. 4, and ciphered data of the desired digital content is downloaded to the terminal 11a of the consumer 1a through the backbone networks 21c, 21b and 21a. The transmission number attached to the transmission start notice is used to manage the data transmission of the desired digital content in cases where the data transmission of the desired digital content is unsuccessfully terminated.

In a step ST50, the ciphered data of the desired digital content is deciphered in the ciphered data deciphering circuit 115 of the terminal 11a, and the desired digital content deciphered is stored in the media storing unit 111. Thereafter, it is checked in the CPU 112 whether or not the desired digital content is correctly downloaded to the terminal 11a. In cases where the desired digital content is not correctly downloaded, the procedure returns to the step ST42, and the steps ST42 to ST50 are again performed.

In cases where the desired digital content is successfully downloaded in the step ST50, a reception completed notice is sent from the terminal 11a of the consumer 1a to the server 31a of the digital content retailer 3a, and a transmission completion notice is sent from the server 31a of the digital content retailer 3a to the resource reservation servers 22a, 22b and 22c of the backbone networks 21a, 21b and 21c.

In a step ST52, the digital content retailer 3a pays the high quality transmission charge to the network operators 2a, 2b and 2c.

Figure 24:
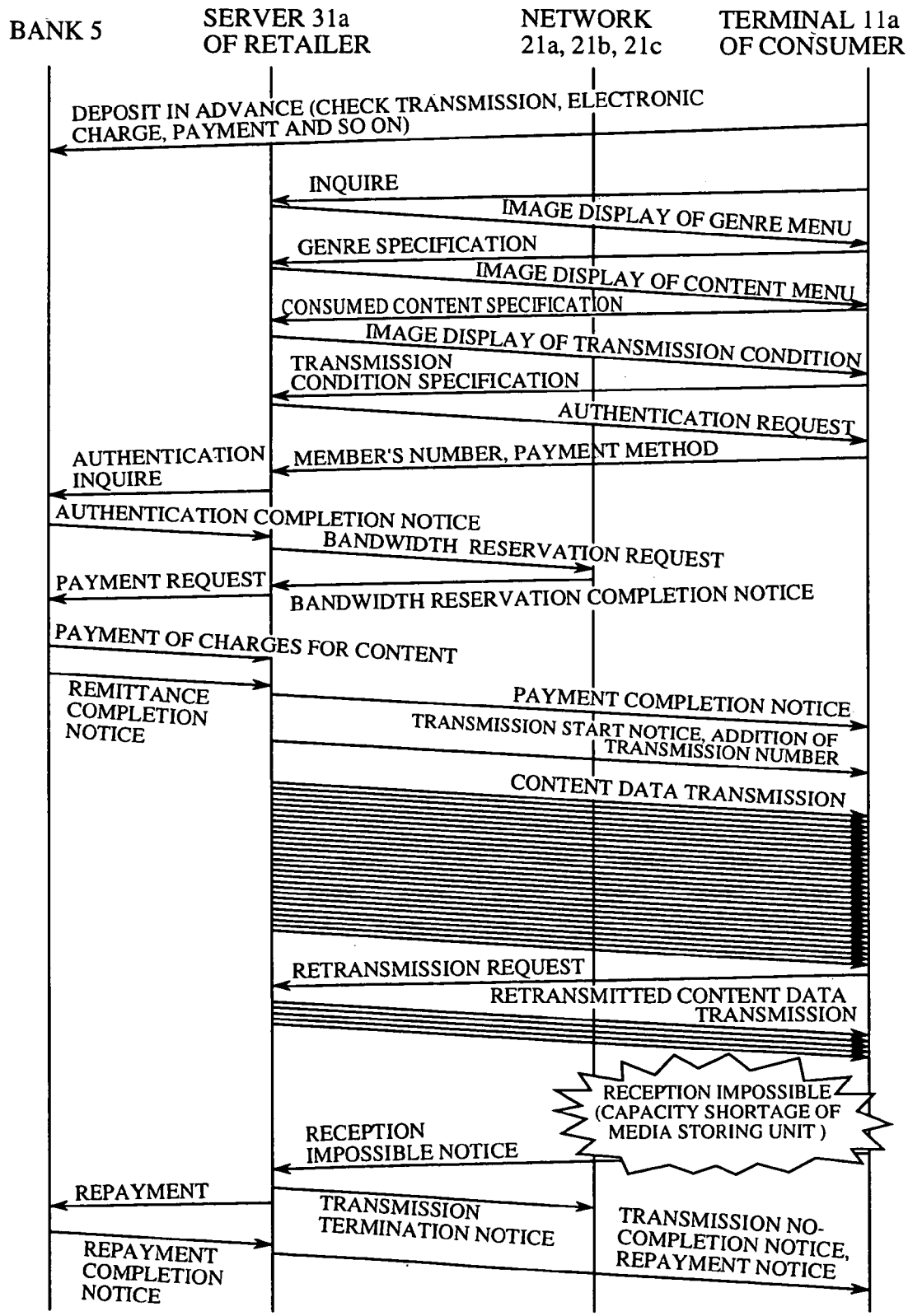
FIG. 24 is a diagram showing a procedure performed in cases where the failure of the data transmission of a desired digital content occurs.

FIG. 24 is a diagram showing a procedure performed in cases where the failure of the data transmission of the desired digital content occurs.

In cases where the consumer 1a fails in receiving the desired digital content in the step ST49, a reception impossible notice is sent from the terminal 11a of the consumer 1a to the server 31a of the digital content retailer 3a, a transmission termination notice is sent from the server 31a of the digital content retailer 3a to the resource reservation servers 22a, 22b and 22c of the networks 21a, 21b and 21c, and the digital content retailer 3a repays the charge for the desired digital content itself and the high quality transmission charge to the bank 5. Thereafter, a repayment completion notice is sent from the bank 5 to the server 31a of the digital content retailer 3a, and information of the transmission no-completion and a repayment notice are sent from the server 31a of the digital content retailer 3a to the terminal 11a of the consumer 1a.

Figure 25:
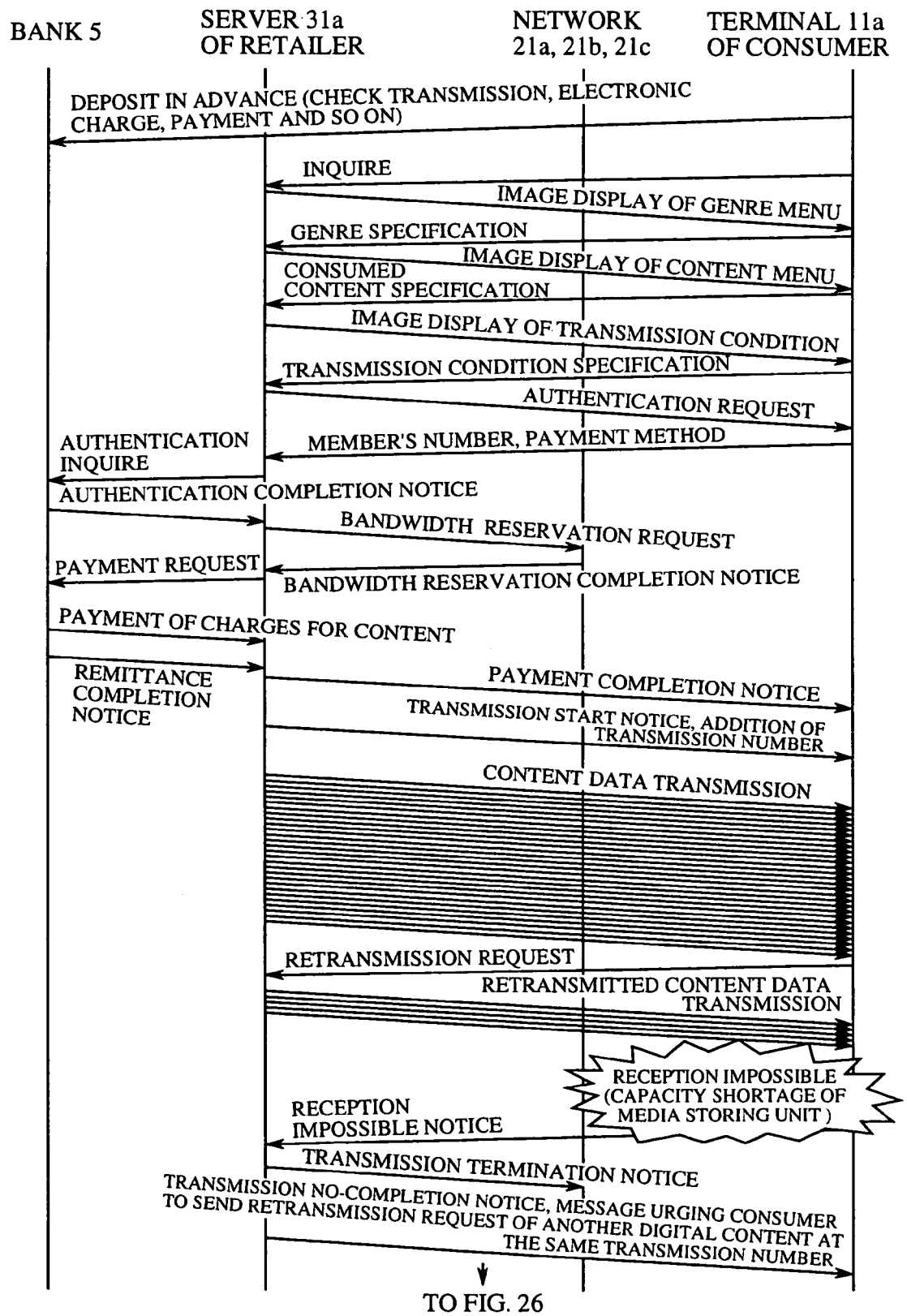
FIG. 25 is a diagram showing the first half of another procedure performed in cases where the failure of the data transmission of the desired digital content occurs.
Figure 26:
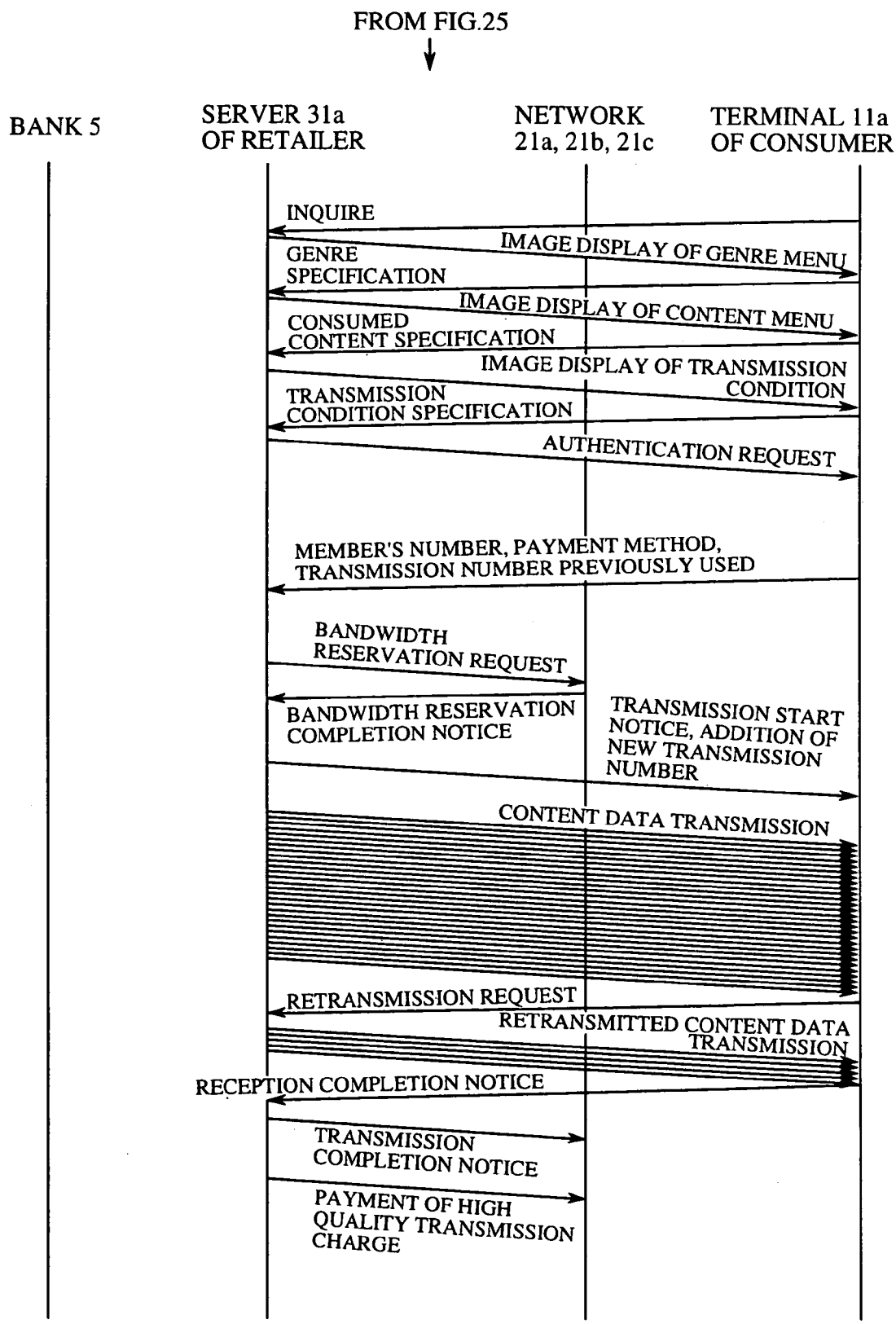
FIG. 26 is a diagram showing the second half of the procedure of which the first half is shown in FIG. 25.

A set of FIG. 25 and FIG. 26 is a diagram showing another procedure performed in cases where the failure of the data transmission of the desired digital content occurs.

In cases where it is judged in the CPU 112 of the terminal 11a in the step ST50 that the terminal 11a of the consumer 1a fails in receiving the ciphered data of the desired digital content, the consumer 1a receives a second desired content at another transmission condition specified by the consumer 1a while covering a charge for the second desired content itself and a high quality transmission charge with the charges for the desired digital content already paid by the bank 5.

In detail, as shown in FIG. 25, when a reception impossible notice is sent from the terminal 11a of the consumer 1a to the server 31a of the digital content retailer 3a, a transmission termination notice is sent from the server 31a of the digital content retailer 3a to the resource reservation servers 22a, 22b and 22c of the networks 21a, 21b and 21c, and a transmission no-completion notice and a message urging the consumer 1a to send a re-transmission request of another digital content to the digital content retailer 3a at the same transmission number are sent from the server 31a of the digital content retailer 3a to the terminal 11a of the consumer 1a.

Thereafter, as shown in FIG. 26, a second genre different from that of the desired digital content relating to the transmission failure is specified by the consumer 1a and is sent to the digital content retailer 3a in the step ST42, a second desired content of the second genre is specified by the consumer 1a and is sent to the digital content retailer 3a in the step ST43, and a second transmission condition for the second desired content is specified by the consumer 1a and is sent to the digital content retailer 3a in the step ST44. Thereafter, when an authentication request sent from the server 31a of the digital content retailer 3a is received in the terminal 1a of the consumer 1a, the personal information such as a member's name, the payment information such as a payment method and the transmission number previously used in the data transmission of the desired digital content are sent from the terminal 11a of the consumer 1a to the server 31a of the digital content retailer 3a in the step ST45. Therefore, because the transmission number previously used in the data transmission of the desired digital content is sent from the consumer 1a to the digital content retailer 3a with the personal information and the payment information of the consumer 1a, the digital content retailer 3a can know that the consumer 1a desires to receive the second desired content at the second transmission condition in place of the receiving of the desired digital content while covering a charge for the second desired content itself and a high quality transmission charge corresponding to the second desired transmission condition with the charges for the desired digital content already paid by the bank 5.

Thereafter, in cases where it is judged in the bank 5 in the step ST46 that the personal information and the payment information specified by the consumer 1a are correct, a bandwidth reservation request is sent from the server 31a of the digital content retailer 3a to the resource reservation servers 22c, 22b and 22a of the backbone networks 21c, 21b and 21a in the step ST47. In cases where a bandwidth reservation completion notice sent from the resource reservation servers 22c, 22b and 22a is received in the server 31a of the digital content retailer 3a in the step ST48, because the consumer 1a covers a charge for the second desired content itself and a high quality transmission charge corresponding to the second desired transmission condition with the charges for the desired digital content already paid the digital content retailer 3a by the bank 5 in the step ST61, the performance of the step ST61 for the second desired content is omitted, and the server 31a of the digital content retailer 3a sends a transmission start notice, to which a new transmission number is attached, to the terminal 11a of the consumer 1a. Thereafter, the procedure is performed in the same manner as that shown in FIG. 23.

Therefore, as shown in FIG. 25 and FIG. 26, even though the terminal 11a of the consumer 1a fails in receiving the desired digital content in the step ST49, the second desired content differing from the desired digital content is downloaded from the content transmission number supplier 3a to the consumer 1a in response to the request by the consumer 1a. In this case, because the transmission number corresponding to the desired digital content and the new transmission number corresponding to the second desired content are sent from the server 31a of the digital content retailer 3a to the terminal 11a of the consumer 1a, the consumer 1a can confirms that the charges for the second desired content indicated by the new transmission number is covered with the charges for the desired digital content indicated by the transmission number.

In cases where the charges for the second desired content differ from the charges for the desired digital content by a difference, the bank 5 settles an account of the difference with the digital content retailer 3a.

Accordingly, in the fourth embodiment, because the consumer 1a deposits money in his or her account of the bank 5 and because the digital content retailer 3a transmits the desired digital content to the consumer 1a after the authentication of the consumer 1a performed by the bank 5 and the payment of the charges for the desired digital content from the bank 5 to the digital content retailer 3a, the digital content retailer 3a can more reliably collect the charge for the desired digital content itself from the consumer 1a.

Also, even though the consumer 1a fails in receiving the desired digital content from the digital content retailer 3a, because the consumer 1a can receive the second desired digital content from the digital content retailer 3a while covering a charge for the second desired content itself and a high quality transmission charge for the second desired content with the charges for the desired digital content already paid to the digital content retailer 3a by the bank 5, the payment of the charges for the second desired digital content received in the consumer 1a can be simplified.

Also, in the fourth embodiment, in cases where the consumer 1a purchases the desired digital content from the digital content retailer 3a through the backbone networks 21a, 21b and 21c, the consumer 1a can specify the downloading of the desired digital content at a high quality transmission condition. Also, in this case, the bank 5 collects in one lump the payment of the consumer 1a corresponding to the charge for the desired digital content itself and the high quality transmission charge, the bank 5 pays the charges to the digital content retailer 3a, and the digital content retailer 3a pays the high quality transmission charge to the network operators 2a, 2b and 2c. Therefore, it is not required that the consumer 1a directly pays the high quality transmission charge to the network operators 2a, 2b and 2c, so that the payment of the consumer 1a can be efficiently performed in the same manner as in the third embodiment.

Also, in the fourth embodiment, because the digital content retailer 3a can confirm the failure of the transmission of the desired digital content, it is not required that the consumer 1a proves the failure of the transmission of the desired digital content in the same manner as in the first embodiment.

Also, in the fourth embodiment, because the data of the digital content is ciphered in the server 31a of the digital content retailer 3a and is downloaded through the backbone networks 21a, 21b and 21c, a probability that a user differing from the consumer 1a unjustly and illegally obtain the digital content can be reduced in the same manner as in the first embodiment.

Also, in the fourth embodiment, in cases where the timers 23a, 23b and 23c are arranged in the backbone networks 21a, 21b and 21c, when the transmission time period of the desired digital content to be downloaded from the server 31a of the digital content retailer 3a to the terminal 11a of the consumer 1a exceeds the allowable data transmission time period set in the timers 23c, 23b and 23a, the transmission of the desired digital content is forcedly terminated by the server 31a of the digital content retailer 3a. Therefore, the bandwidth of the backbone networks 21c, 21b and 21a can be efficiently used in the same manner as in the second embodiment.

What is claimed is:

1. A digital content downloading method using a network in which digital content is downloaded, comprising the steps of:
   receiving through a network information designating a desired digital content selected by a consumer terminal and a desired digital content transmission condition related to quality of communication selected by the consumer terminal, at a digital content retailer computer system possessing the desired digital content;
   sending a request from the digital content retailer computer system to a resource reservation server of a network operator computer system, for a reservation for the network managed by the network operator computer system according to the desired digital content transmission condition sent from the consumer terminal;
   providing from the digital content retailer computer system the desired digital content designated by the information, to the consumer terminal through the network reserved by the digital content retailer computer system at the desired digital content transmission condition sent from the consumer terminal;
   collecting from the consumer terminal, by the digital content retailer computer system, a charge for the desired digital content, the charge including a transmission charge corresponding to the desired digital content transmission condition; and
   paying, by the digital content retailer computer system, the transmission charge to the network operator computer system.

2. A digital content downloading method using a network, according to claim 1, wherein the desired digital content transmission condition selected by the consumer terminal includes a transmission time condition.

3. A digital content downloading method using a network, according to claim 1, wherein the network is composed of a plurality of networks managed by a plurality of network operator computer systems, and the desired digital content transmission condition selected by the consumer terminal corresponds to a communication quality of each of the networks.

4. A digital content downloading method using a network, according to claim 3, wherein the communication quality of each network is determined by at least one of a data transfer rate, a delay time, a delay variation, a burst size, a cell interval and a cell discard rate.

5. A digital content downloading method using a network, according to claim 3, wherein a bandwidth of the network is reserved with a time condition in the network reservation according to the desired digital content transmission condition.

6. A digital content downloading method using a network, according to claim 1, wherein the desired digital content transmission condition selected by the consumer terminal is a bandwidth guarantee type transmission condition, in which a transmission time period is guaranteed, or a bandwidth no-guarantee type transmission condition, in which a transmission time period is not guaranteed, and the transmission charge is heightened as the transmission time period is shortened.

7. A digital content downloading method using a network, according to claim 1, wherein the step of providing the desired digital content includes:
   checking, by the digital content retailer computer system, through the network whether or not the consumer terminal is capable of receiving the desired digital content, before the desired digital content is provided to the consumer terminal at the desired digital content transmission condition.

8. A digital content downloading method using a network, according to claim 1, wherein the step of providing the desired digital content includes:
   connecting the consumer terminal to the network through a subscriber line which is composed of a telephone line, an optical fiber cable, a coaxial cable or a radio transmission line.

9. A digital content downloading method using a network, according to claim 1, further comprising:
   sending, from the digital content retailer computer system, a transmission start notice to the consumer terminal before providing the desired digital content;
   managing, by a network operator computer system, a transmission time period in the transmission of the desired digital content until the digital content retailer computer system sends a transmission completion notice to the network operator computer system;
   sending, from the network operator computer system, a time-out notice to the digital content retailer computer system in cases where the transmission time period exceeds a prescribed value; and
   forcedly terminating, by the digital content retailer computer system, the providing of the desired digital content in cases where the digital content retailer computer system receives the time-out notice from the network operator computer system.

10. A digital content downloading method using a network, according to claim 1, wherein the step of providing the desired digital content includes:
   ciphering, by the digital content retailer computer system, the desired digital content; and
   providing from the digital content retailer computer system, ciphered data of the desired digital content.

11. A digital content downloading method using a network, according to claim 1, wherein the step of receiving the information and the desired digital content transmission condition includes:
   receiving from the consumer terminal personal information and payment information of the consumer terminal, at the digital content retailer computer system;
   making an inquiry to a credit company computer system whether or not the personal information and the payment information received from the consumer terminal is correct;
   requesting that the credit company computer system perform the authentication of the consumer according to the personal information and the payment information; and
   requesting the credit company computer system to send an authentication notice to the digital content retailer computer system in cases where the personal information and the payment information is correct.

12. A digital content downloading method using a network, according to claim 1, wherein the step of collecting a charge for the desired digital content includes:
   sending, from the digital content retailer computer system, an accounting notice corresponding to the charge for the desired digital content to a credit company computer system;
   requesting that the credit company computer system send a bill, which corresponds to the charge for the desired digital content, to the consumer terminal in response to the accounting notice;
   requesting that the consumer pay the charge for the desired digital content to the credit company computer system in response to the bill; and
   requesting that the credit company pay the charge paid by the consumer, to the digital content retailer.

13. A digital content downloading method using a network, according to claim 1, wherein the step of providing the desired digital content includes:
   receiving, at the digital content retailer computer system, a reception impossible notice from the consumer indicating that the consumer terminal has not received the desired digital content;
   sending a transmission termination notice to the network operator computer system from the digital content retailer terminal; and
   sending a transmission no-completion notice to the consumer terminal from the digital content retailer computer system.

14. A digital content downloading method using a network, according to claim 1, wherein the desired digital content computer system is a music file, a video file or a game software title.

* * * * *